(12) United States Patent
Ramasubramonian et al.

(10) Patent No.: US 9,807,406 B2
(45) Date of Patent: Oct. 31, 2017

(54) PICTURE FLUSHING AND DECODED PICTURE BUFFER PARAMETER INFERENCE FOR MULTI-LAYER BITSTREAMS

(71) Applicant: QUALCOMM Incorporated, San Diego, CA (US)

(72) Inventors: Adarsh Krishnan Ramasubramonian, San Diego, CA (US); Ye-Kui Wang, San Diego, CA (US); Fnu Hendry, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 14/656,469

(22) Filed: Mar. 12, 2015

(65) Prior Publication Data

US 2015/0264370 A1 Sep. 17, 2015

Related U.S. Application Data

(60) Provisional application No. 61/954,536, filed on Mar. 17, 2014, provisional application No. 61/955,152, (Continued)

(51) Int. Cl.
  *H04N 7/12* (2006.01)
  *H04N 11/02* (2006.01)
  (Continued)

(52) U.S. Cl.
  CPC ............ *H04N 19/33* (2014.11); *H04N 19/167* (2014.11); *H04N 19/18* (2014.11); *H04N 19/187* (2014.11);
  (Continued)

(58) Field of Classification Search
  CPC ........ H04N 19/33; H04N 19/70; H04N 19/30; H04N 19/423; H04N 19/187;
  (Continued)

(56) References Cited

U.S. PATENT DOCUMENTS

2013/0064284 A1* 3/2013 Samuelsson ........... H04N 19/70
375/240.01

OTHER PUBLICATIONS

International Search Report and Written Opinion—PCT/US2015/020496—ISA/EPO—May 20, 2015.
(Continued)

*Primary Examiner* — Jared Walker
(74) *Attorney, Agent, or Firm* — Knobbe, Martens, Olson & Bear, LLP

(57) ABSTRACT

An apparatus according to certain aspects includes a memory and a processor configured to: in response to determining that a reference layer intra random access point (IRAP) picture starts a new coded video sequence (CVS) at the current AU: determine whether the reference layer IRAP picture activates a new video parameter set (VPS) or defines a prediction boundary at the current AU; in response to determining that the reference layer IRAP picture activates a new VPS or defines a prediction boundary at the current AU, remove pictures in the decoded picture buffer (DPB) associated with each of a plurality of layers; and in response to determining that the reference layer IRAP picture does not activate a new VPS and does not define a prediction boundary at the current AU, remove only pictures in the DPB associated with the reference layer.

28 Claims, 8 Drawing Sheets

Related U.S. Application Data filed on Mar. 18, 2014, provisional application No. 61/955,763, filed on Mar. 19, 2014.

(51) Int. Cl.

| | | |
|---|---|---|
| *H04N 11/04* | (2006.01) | |
| *H04N 19/33* | (2014.01) | |
| *H04N 19/167* | (2014.01) | |
| *H04N 19/18* | (2014.01) | |
| *H04N 19/187* | (2014.01) | |
| *H04N 19/196* | (2014.01) | |
| *H04N 19/70* | (2014.01) | |
| *H04N 19/30* | (2014.01) | |
| *H04N 19/423* | (2014.01) | |
| *H04N 19/597* | (2014.01) | |

(52) U.S. Cl.
CPC ........... *H04N 19/196* (2014.11); *H04N 19/30* (2014.11); *H04N 19/423* (2014.11); *H04N 19/70* (2014.11); *H04N 19/597* (2014.11)

(58) Field of Classification Search
CPC .... H04N 19/167; H04N 19/18; H04N 19/196; H04N 19/597
USPC ..................................................... 375/240.02
See application file for complete search history.

(56) References Cited

OTHER PUBLICATIONS

Ramasubramonian A.K., et al., "MV-HEVC/SHVC HLS: On Flushing of Decoded Pictures from the DPB based on NoOutputOfPriorPicsFlag" JCT-VC Meeting; Oct. 23, 2013-Nov. 1, 2013; Geneva, (Joint Collaborative Team on Video Coding of ISO/IEC JTC1/SC29/WG11 and ITU-T SG.16 ); URL: HTTP://WFTP3.ITU.INT/AV-ARCH/JCTVC-SITE/,, No. JCTVC-O0266, Oct. 15, 2013 (Oct. 15, 2013), XP030115331, 8 pages.

Ramasubramonian A.K., et al., "MV-HEVC/SHVC HLS: On picture flushing and DPB parameters", 8. JCT-3V Meeting; Mar. 29, 2014-Apr. 4, 2014; Valencia; (The Joint Collaborative Team on 3D Video Coding Extension Development of ISO/IEC JTC1/SC29/WG11 and ITU-T SG.16 ); URL: HTTP://PHENIX.INT-EVRY.FR/JCT2/,, No. JCT3V-H0045, Mar. 20, 2014 (Mar. 20, 2014), XP030132094, 13 pages.

Tech G., et al., "HEVC Multiview Extensions MV-HEVC Draft Text 7," 107. MPEG Meeting; Jan. 13, 2014-Jan. 17, 2014; San Jose; (Motion Picture Expert Group or ISO/IEC JTC1/SC29/WG11), No. JCT3V-G1004, Feb. 28, 2014 (Feb. 28, 2014), XP030020972, 130 pages.

Wang Y.K., et al., "AHG9: On some fundamental concepts in HEVC 3DV and scalable extensions," 104. MPEG Meeting; Apr. 22, 2013-Apr. 26, 2013; INCHEON; (Motion Picture Expert Group or ISO/IEC JTC1/SC29/WG11), No. m28721, Apr. 25, 2013 (Apr. 25, 2013), XP030057254, 3 pages.

* cited by examiner

PICTURE FLUSHING AND DECODED PICTURE BUFFER PARAMETER INFERENCE FOR MULTI-LAYER BITSTREAMS

INCORPORATION BY REFERENCE TO ANY PRIORITY APPLICATIONS

This application claims the benefit of U.S. Provisional Application No. 61/954,536, filed Mar. 17, 2014, U.S. Provisional Application No. 61/955,152, filed Mar. 18, 2014, and U.S. Provisional Application No. 61/955,763, filed Mar. 19, 2014, each of which is incorporated by reference in its entirety. Any and all applications for which a foreign or domestic priority claim is identified in the Application Data Sheet as filed with the present application are hereby incorporated by reference under 37 CFR 1.57.

TECHNICAL FIELD

This disclosure relates to the field of video coding and compression, including both single-layer video coding and multi-layer video coding. Multi-layer video coding can include scalable video coding, multiview video coding, three-dimensional (3D) video coding, etc.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

Scalable video coding refers to video coding in which a base layer (BL), sometimes referred to as a reference layer (RL), and one or more scalable enhancement layers (ELs) are used. In scalable video coding, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

An apparatus for coding video information according to certain aspects includes a memory and a processor. The memory unit is configured to store video information associated with a plurality of layers including a reference layer, the memory comprising a decoded picture buffer (DPB) associated with each layer. The processor is configured to obtain, from the reference layer, an intra random access point (IRAP) picture in a current access unit (AU) to be coded. The processor is further configured to: in response to determining that the reference layer IRAP picture starts a new coded video sequence (CVS) at the current AU: determine whether the reference layer IRAP picture activates a new video parameter set (VPS) or defines a prediction boundary at the current AU; in response to determining that the reference layer IRAP picture activates a new VPS or determining that the reference layer IRAP picture defines a prediction boundary at the current AU, remove pictures in the DPB associated with each of the plurality of layers; and in response to determining that the reference layer IRAP picture does not activate a new VPS and determining that the reference layer IRAP picture does not define a prediction boundary at the current AU, remove only pictures in the DPB associated with the reference layer.

The systems, methods and devices of this disclosure each have several innovative aspects, no single one of which is solely responsible for the desirable attributes disclosed herein. The details of one or more examples are set forth in the accompanying drawings and the description below, which are not intended to limit the full scope of the inventive concepts described herein. Other features, objects, and advantages will be apparent from the description and drawings, and from the claims.

DETAILED DESCRIPTION

Figure 1A:
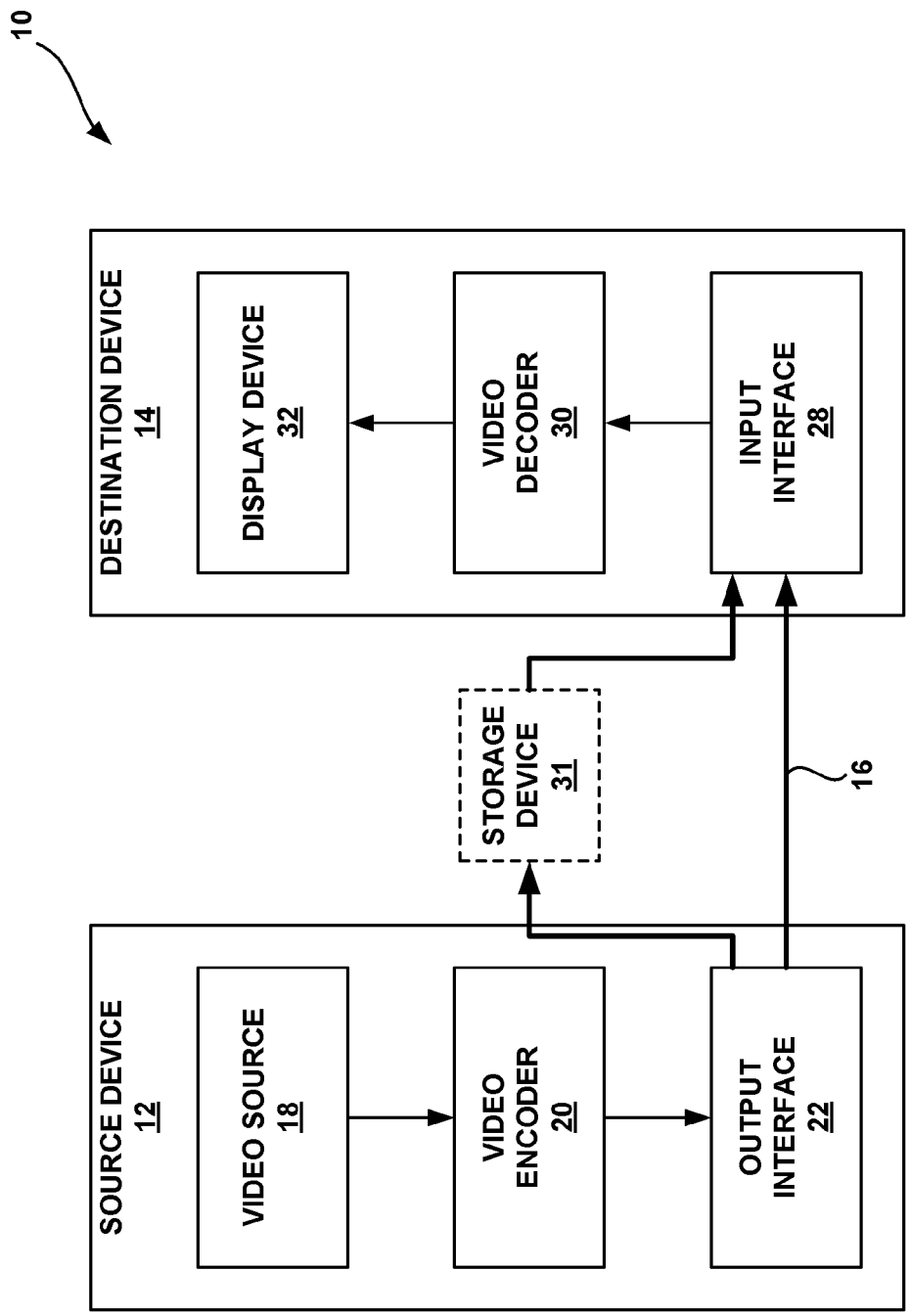
FIG. 1A is a block diagram illustrating an example video encoding and decoding system that may utilize techniques in accordance with aspects described in this disclosure.

In general, this disclosure relates to single layer coding as well as inter-layer prediction for scalable video coding in the context of advanced video codecs, such as HEVC (High Efficiency Video Coding). More specifically, the present disclosure relates to systems and methods for improved performance of inter-layer prediction in scalable video coding extension of HEVC, which may be referred to as SHVC.

In the description below, H.264/Advanced Video Coding (AVC) techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization (ISO) and the International Electrotechnical Commission (IEC) (ISO/IEC) Moving Picture Experts Group (MPEG) 1 (MPEG-1) Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from the units of prediction (e.g., macroblock) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as the base layer, and a higher layer such as the enhancement layer) of video data. A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its SVC and MVC extensions.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Overview

Intra random access point (IRAP) pictures can provide random access points for decoding a bitstream. A decoder may start decoding a bitstream by decoding an IRAP picture without having to decode pictures that precede the IRAP picture. At the time of decoding an IRAP picture, the decoded picture buffer (DPB) may have a number of decoded pictures in the buffer. If outputting the existing pictures in the DPB would affect the performance of the decoder (e.g., too many pictures exist in the DPB for the decoder to output, outputting all pictures could result in uneven frame rate, etc.), it may be desirable to remove such existing pictures without outputting them (e.g., flush the existing pictures).

In earlier versions developments, and/or discussions of SHVC and MV-HEVC (e.g., Working Draft 7 of MV-HEVC and also to be reflected in Working Drafts of SHVC subsequent to Working Draft 5), the flushing process is invoked for each layer when multiple layers or multiple views exist in a bitstream. During this process, the pictures may be output based on the value of NoOutputOfPriorPicsFlag derived for the respective layer. The variable NoOutputOfPriorPicsFlag can indicate, when decoding an IRAP picture, whether pictures in the DPB should be output prior to being removed from the DPB. If an access unit (AU) does not have pictures that belong to a layer in the list of layers to be decoded, then the pictures that precede the access unit in decoding order would not be flushed even though they are marked as "unused for reference." These lingering pictures could end up using the DPB memory and could result in buffer overflow when decoding subsequent pictures.

In order to address these and other challenges, the techniques according to certain aspects can provide several ways and/or embodiments for properly flushing pictures in the DPBs of different layers even when an AU may not include a picture in a particular layer. For instance, the flushing of DPBs for all layers can be triggered based on whether the base layer picture meets certain conditions. By triggering the flushing of all layers based on the base layer picture, the techniques can invoke flushing for all layers in an AU even if a particular layer in that AU does not have a picture.

In addition, in earlier versions of SHVC and MV-HEVC (e.g., Working Draft 5 of SHVC and Working Draft 7 of MV-HEVC), any HEVC bitstream or any SHVC/MV-HEVC bitstream would be conformant to one or more profiles in Annex A and one or more profiles in Annex G or H. For example, a HEVC bitstream would conform to a profile in Annex A. A SHVC/MV-HEVC bitstream would conform to a profile in Annex G or H; the base layer in a SHVC/MV-HEVC bitstream generally also conforms to Annex A for backward compatibility. In addition, even the SHVC/MV-HEVC bitstream itself may conform to a profile in Annex A. Accordingly, when bitstreams are decoded using these Annexes in the standard, the DPB parameters to be used are either ambiguous or unavailable. Moreover, the DPB parameters signaled in the VPS extension are neither signaled nor inferred for the 0-th output layer set, where the layer set only comprises the base layer and only the base layer pictures are output.

In order to address these and other challenges, the techniques according to certain aspects can set various attributes in the active SPS of the base layer to be equal to the corresponding maximum values allowed for the various attributes. For example, the SPS can include various DPB parameters, such as MaxLayerDecPicBuffMinus1, MaxNumReorderPics, MaxLatencyIncreasePlus1, MaxLatencyPictures, and MaxDecPicBufferingMinus1. Or the maximum values for various attributes are set equal to the values of the various attributes of the active SPS. By setting the values of the various attributes of the active SPS equal to the maximum values allowed for the various attributes, the techniques can reduce or eliminate the ambiguity in or unavailability of DPB parameters to be applied.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
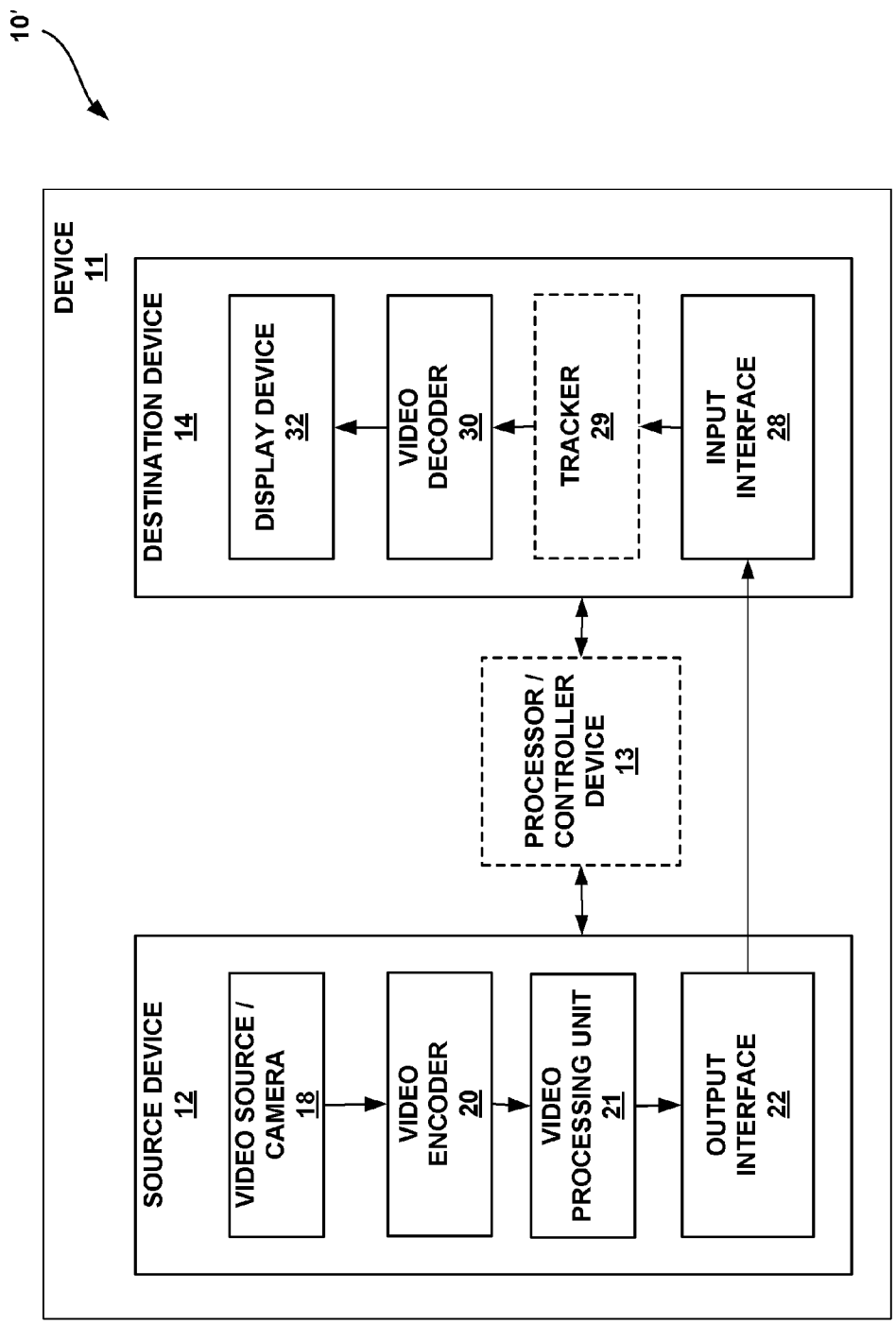
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source and destination devices 12, 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to an optional storage device 31. Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, a video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones," as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A, the video encoder 23 illustrated in FIG. 2B, or any other video encoder described herein.

In the example of FIG. 1A, the destination device 14 includes an input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3A, the video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination devices 12, 14 are on or part of a device 11. The device 11 may be a telephone handset, such as a "smart" phone or the like. The device 11 may include an optional controller/processor device 13 in operative communication with the source and destination devices 12, 14. The system 10' of FIG. 1B may further include a video processing unit 21 between the video encoder 20 and the output interface 22. In some implementations, the video processing unit 21 is a separate unit, as illustrated in FIG. 1B; however, in other implementations, the video processing unit 21 can be implemented as a portion of the video encoder 20 and/or the processor/controller device 13. The system 10' may also include an optional tracker 29, which can track an object of interest in a video sequence. The object or interest to be tracked may be segmented by a technique described in connection with one or more aspects of the present disclosure. In related aspects, the tracking may be performed by the display device 32, alone or in conjunction with the tracker 29. The system 10' of FIG. 1B, and components thereof, are otherwise similar to the system 10 of FIG. 1A, and components thereof.

The video encoder 20 and the video decoder 30 may operate according to a video compression standard, such as the HEVC, and may conform to a HEVC Test Model (HM). Alternatively, the video encoder 20 and video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. A SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples.

The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2A:
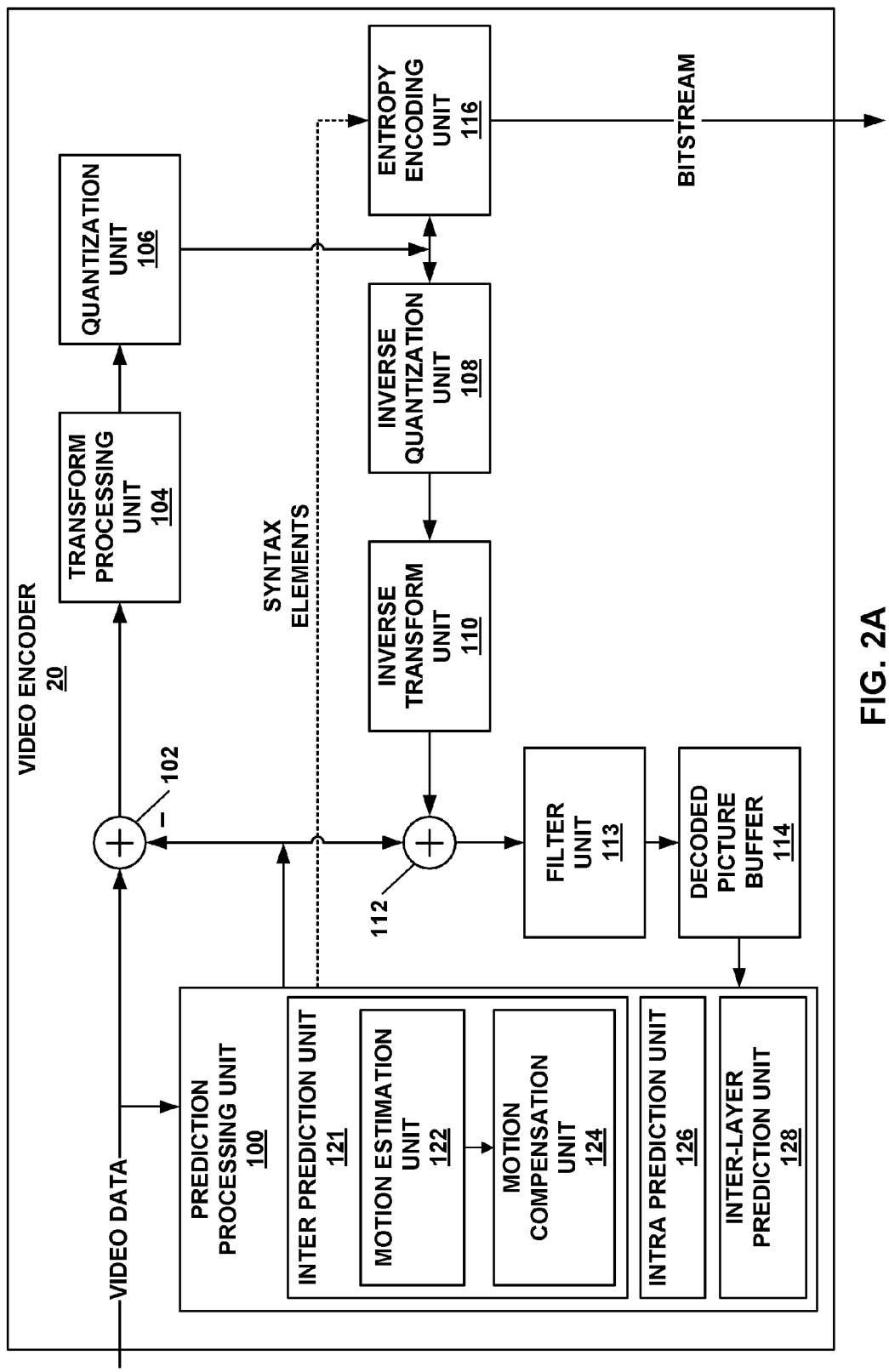
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure, including but not limited to the methods of inferring NoOutputOfPriorPicsFlag and related processes described in greater detail above and below with respect to FIGS. 4 and 5. As one example, prediction processing unit 100 may be configured to perform any or all of the techniques described in this disclosure. In another embodiment, the video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2A separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As further discussed below with reference to FIG. 5, the prediction processing unit 100 may be configured to code (e.g., encode or decode) the PU (or any other reference layer and/or enhancement layer blocks or video units) by performing the methods illustrated in FIG. 5. For example, inter prediction unit 121 (e.g., via motion estimation unit 122 and/or motion compensation unit 124), intra prediction unit 126, or inter-layer prediction unit 128 may be configured to perform the methods illustrated in FIG. 5, either together or separately.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in scalable video coding (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
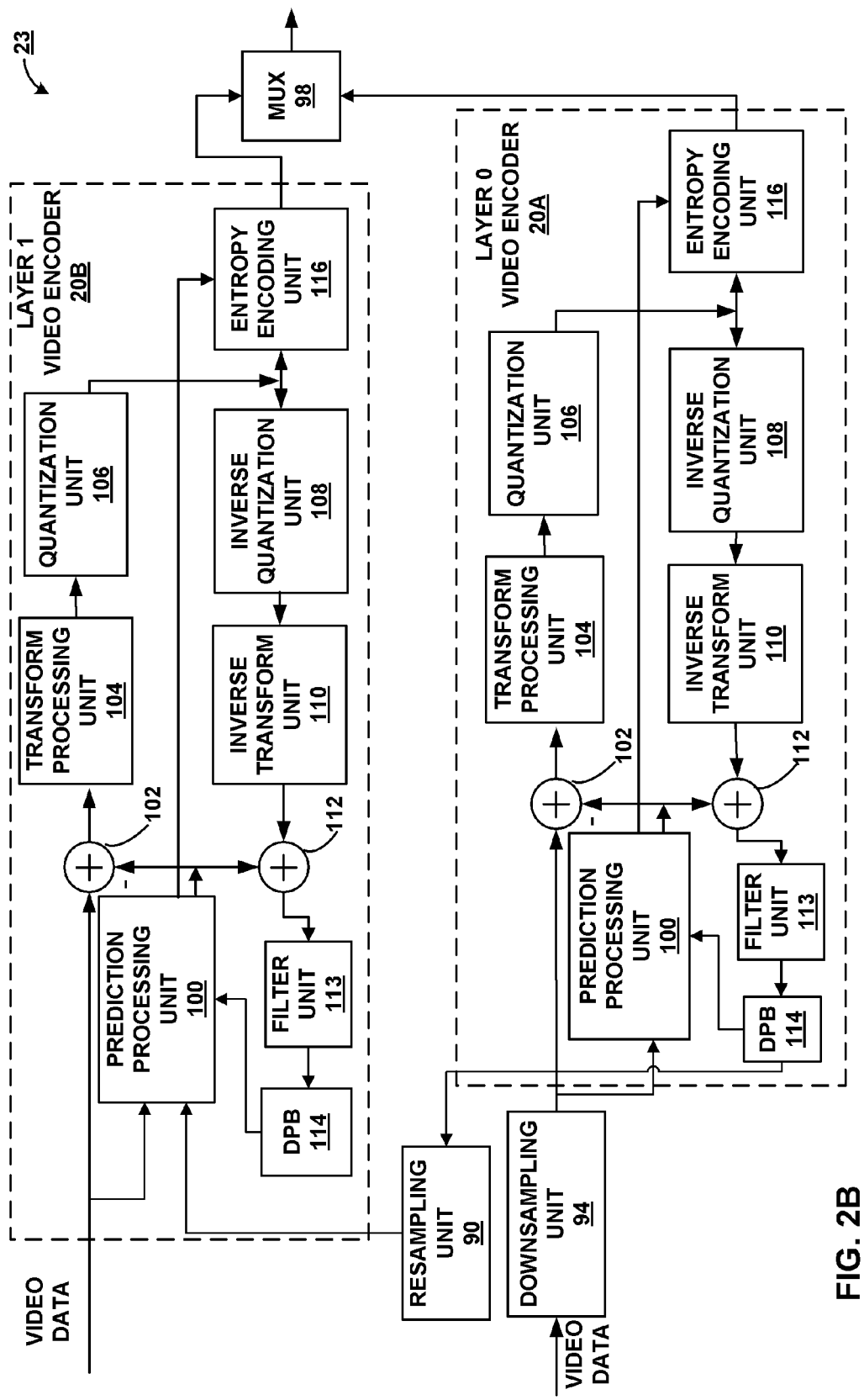
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. The video encoder 23 may be configured to process multi-layer video frames, such as for SHVC and multiview coding. Further, the video encoder 23 may be configured to perform any or all of the techniques of this disclosure.

The video encoder 23 includes a video encoder 20A and video encoder 20B, each of which may be configured as the video encoder 20 and may perform the functions described above with respect to the video encoder 20. Further, as indicated by the reuse of reference numbers, the video encoders 20A and 20B may include at least some of the systems and subsystems as the video encoder 20. Although the video encoder 23 is illustrated as including two video encoders 20A and 20B, the video encoder 23 is not limited as such and may include any number of video encoder 20 layers. In some embodiments, the video encoder 23 may include a video encoder 20 for each picture or frame in an access unit. For example, an access unit that includes five pictures may be processed or encoded by a video encoder that includes five encoder layers. In some embodiments, the video encoder 23 may include more encoder layers than frames in an access unit. In some such cases, some of the video encoder layers may be inactive when processing some access units.

In addition to the video encoders 20A and 20B, the video encoder 23 may include an resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may up sample the spatial size or number of pixels of the base layer, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the prediction processing unit 100 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of the video encoder 20A may be provided directly, or at least without being provided to the resampling unit 90, to the prediction processing unit 100 of the video encoder 20B. For example, if video data provided to the video encoder 20B and the reference picture from the decoded picture buffer 114 of the video encoder 20A are of the same size or resolution, the reference picture may be provided to the video encoder 20B without any resampling.

In some embodiments, the video encoder 23 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 23 may further include a multiplexor 98, or mux. The mux 98 can output a combined bitstream from the video encoder 23. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from the video encoder 23.

Video Decoder

Figure 3A:
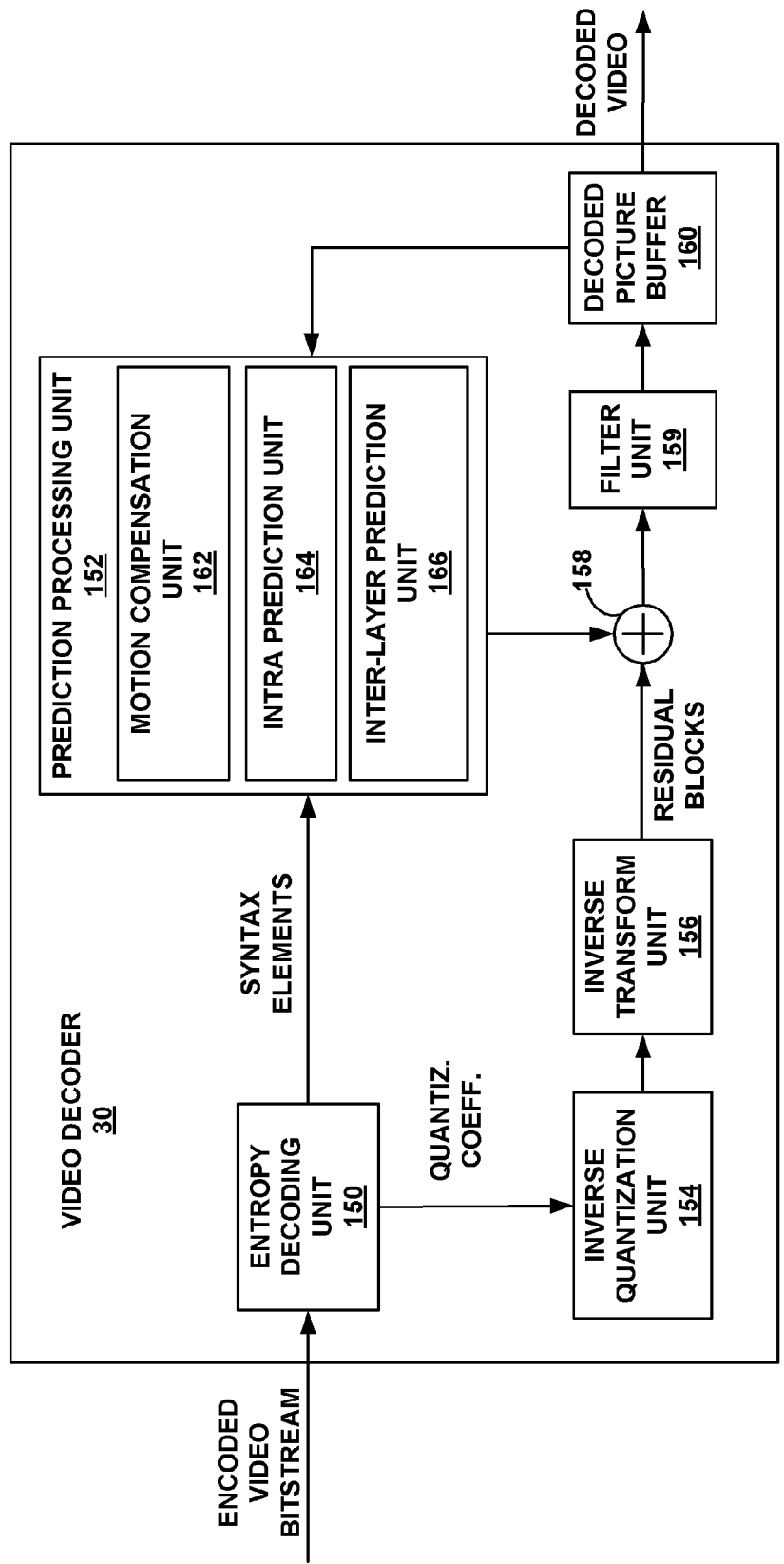
FIG. 3A is a block diagram illustrating an example of a video decoder that may implement techniques in accordance with aspects described in this disclosure.

FIG. 3A is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure, including but not limited to the methods of inferring NoOutputOfPriorPicsFlag and related processes described in greater detail above and below with respect to FIGS. 4 and 5. As one example, motion compensation unit 162 and/or intra prediction unit 164 may be configured to perform any or all of the techniques described in this disclosure. In one embodiment, the video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of the video decoder 30 may be duplicated for processing of a multi-layer codec.

In the example of FIG. 3A, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to the video encoder 20 of FIG. 2A. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

As further discussed below with reference to FIG. 5, the prediction processing unit 152 may code (e.g., encode or decode) the PU (or any other reference layer and/or enhancement layer blocks or video units) by performing the methods illustrated in FIG. 5. For example, motion compensation unit 162, intra prediction unit 164, or inter-layer prediction unit 166 may be configured to perform the methods illustrated in FIG. 5, either together or separately.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the EL) using one or more different layers that are available in scalable video coding (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Multi-Layer Decoder

Figure 3B:
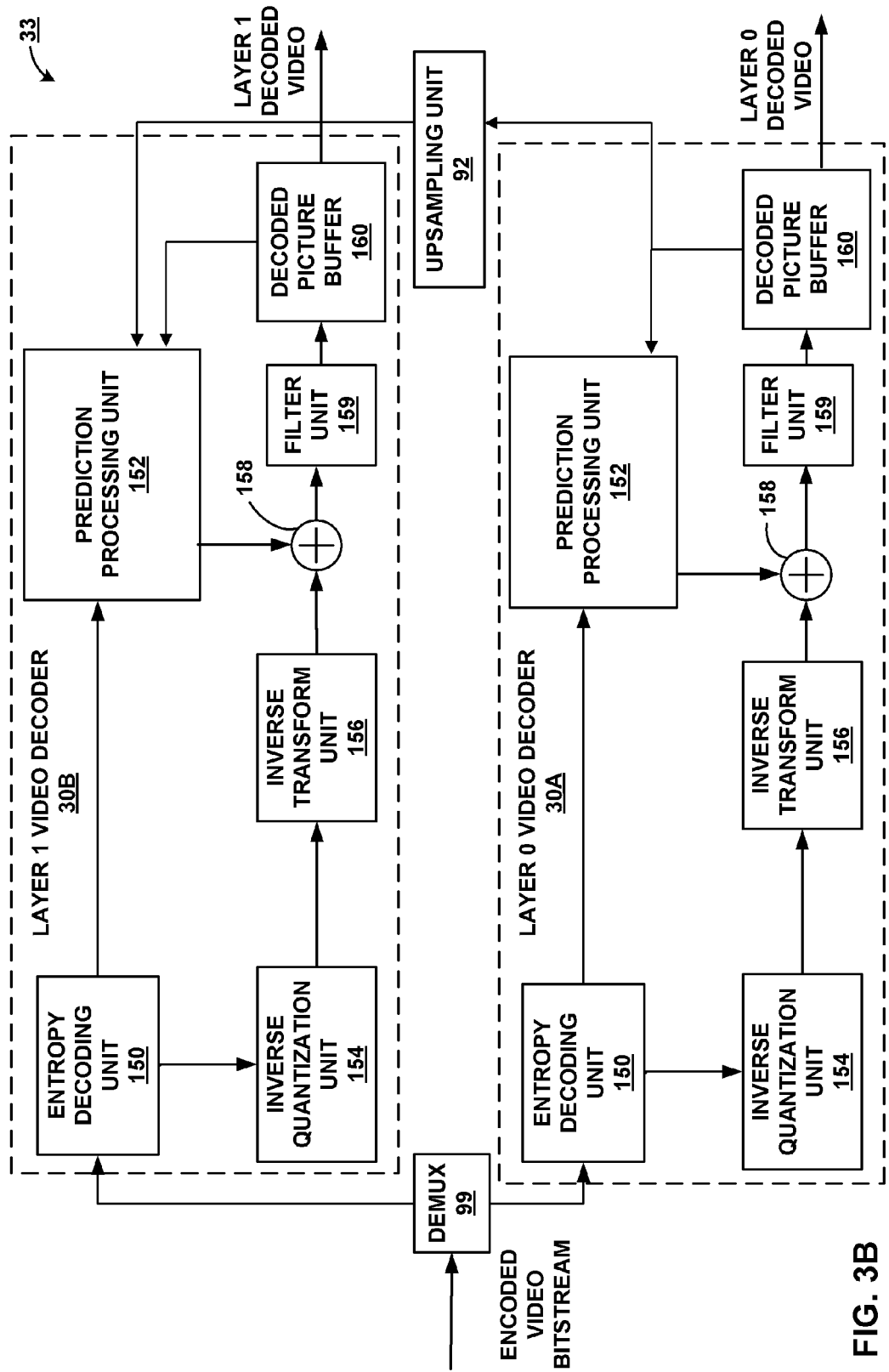
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. The video decoder 33 may be configured to process multi-layer video frames, such as for SHVC and multiview coding. Further, the video decoder 33 may be configured to perform any or all of the techniques of this disclosure.

The video decoder 33 includes a video decoder 30A and video decoder 30B, each of which may be configured as the video decoder 30 and may perform the functions described above with respect to the video decoder 30. Further, as indicated by the reuse of reference numbers, the video decoders 30A and 30B may include at least some of the systems and subsystems as the video decoder 30. Although the video decoder 33 is illustrated as including two video decoders 30A and 30B, the video decoder 33 is not limited as such and may include any number of video decoder 30 layers. In some embodiments, the video decoder 33 may include a video decoder 30 for each picture or frame in an access unit. For example, an access unit that includes five pictures may be processed or decoded by a video decoder that includes five decoder layers. In some embodiments, the video decoder 33 may include more decoder layers than frames in an access unit. In some such cases, some of the video decoder layers may be inactive when processing some access units.

In addition to the video decoders 30A and 30B, the video decoder 33 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., the video decoder 30A) and to upsample the picture (or the received picture information). This upsampled picture may then be provided to the prediction processing unit 152 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of the video decoder 30A may be provided directly, or at least without being provided to the upsampling unit 92, to the prediction processing unit 152 of the video decoder 30B. For example, if video data provided to the video decoder 30B and the reference picture from the decoded picture buffer 160 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 160 of the video decoder 30A.

As illustrated in FIG. 3B, the video decoder 33 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 33, such as from a processor on a destination device including the destination module 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by the video decoder 33.

Intra Random Access Point (IRAP) Pictures

Some video coding schemes may provide various random access points throughout the bitstream such that the bitstream may be decoded starting from any of those random access points without needing to decode any pictures that precede those random access points in the bitstream. For example, this may be the case when the bitstream includes a single layer or when a random access point has IRAP pictures at all layers. In such video coding schemes, all pictures that follow a random access point in output order (e.g., including those pictures that are in the same access unit as the picture providing the random access point) can be correctly decoded without using any pictures that precede the random access point. For example, even if a portion of the bitstream is lost during transmission or during decoding, a decoder can resume decoding the bitstream starting from the next random access point. Some video schemes may provide random access points such that decoding of base layer pictures, and additionally pictures belonging to zero or more other layers in the bitstream, may be started from any of these random access points without decoding any pictures that precede those random access points, but not all layers may be correctly decodable when decoding starts at those random access points. Correct decoding of all layers may happen at a subsequent access unit. Support for random access may facilitate, for example, dynamic streaming services, seek operations, channel switching, etc.

In some coding schemes, such random access points may be provided by pictures that are referred to as IRAP pictures. For example, a random access point (e.g., provided by an enhancement layer IRAP picture) in an enhancement layer ("layerA") contained in an access unit ("auA") may provide layer-specific random access such that for each reference layer ("layerB") of layerA (e.g., a reference layer being a layer that is used to predict layerA) having a random access point contained in an access unit ("auB") that is in layerB and precedes auA in decoding order (or a random access point contained in auA), the pictures in layerA that follow auA in output order (including those pictures located in auA), are correctly decodable without needing to decode any pictures in layerA that precede auA when decoding starts at access unit auB or at an access unit that precedes auB in decoding order.

IRAP pictures may be coded using intra prediction (e.g., coded without referring to other pictures), and may include, for example, instantaneous decoding refresh (IDR) pictures, clean random access (CRA) pictures, and broken link access (BLA) pictures. When there is an IDR picture in the bitstream, all the pictures that precede the IDR picture in decoding order are not used for prediction by pictures that follow the IDR picture in decoding order. When there is a CRA picture in the bitstream, the pictures that follow the CRA picture may or may not use pictures that precede the CRA picture in decoding order for prediction. Those pictures that follow the CRA picture in decoding order but use pictures that precede the CRA picture in decoding order may be referred to as random access skipped leading (RASL) pictures. Another type of picture that follows an IRAP picture in decoding order and precedes the IRAP picture in output order is a random access decodable leading (RADL) picture, which may not contain references to any pictures that precede the IRAP picture in decoding order. RASL pictures may be discarded by the decoder if the pictures that precede the CRA picture are not available. A BLA picture indicates to the decoder that pictures that precede the BLA picture may not be available to the decoder (e.g., because two bitstreams are spliced together and the BLA picture is the first picture of the second bitstream in decoding order). An access unit (e.g., a group of pictures consisting of all the coded pictures associated with the same output time across multiple layers) containing a base layer picture (e.g., a picture having a layer ID value of 0) that is an IRAP picture may be referred to as an IRAP access unit.

Cross-Layer Alignment of IRAP Pictures

In scalable video coding, IRAP pictures may not be required to be aligned (e.g., contained in the same access unit) across different layers. For example, if IRAP pictures were required to be aligned, any access unit containing at least one IRAP picture would only contain IRAP pictures. On the other hand, if IRAP pictures were not required to be aligned, in a single access unit, one picture (e.g., in a first layer) may be an IRAP picture, and another picture (e.g., in a second layer) may be a non-IRAP picture. Having such non-aligned IRAP pictures in a bitstream may provide some advantages. For example, in a two-layer bitstream, if there are more IRAP pictures in the base layer than in the enhancement layer, in broadcast and multicast applications, low tune-in delay and high coding efficiency can be achieved.

In some video coding schemes, a picture order count (POC) may be used to keep track of the relative order in which the decoded pictures are displayed. Some of such coding schemes may cause the POC values to be reset (e.g., set to zero or set to some value signaled in the bitstream) whenever certain types of pictures appear in the bitstream. For example, the POC values of certain IRAP pictures may be reset, causing the POC values of other pictures preceding those IRAP pictures in decoding order to also be reset. This may be problematic when the IRAP pictures are not required to be aligned across different layers. For example, when one picture ("picA") is an IRAP picture and another picture ("picB") in the same access unit is not an IRAP picture, the POC value of a picture ("picC"), which is reset due to picA being an IRAP picture, in the layer containing picA may be different from the POC value of a picture ("picD"), which is not reset, in the layer containing picB, where picC and picD are in the same access unit. This causes picC and picD to have different POC values even though they belong to the same access unit (e.g., same output time). Thus, in this example, the derivation process for deriving the POC values can be modified to produce POC values that are consistent with the definition of POC values and access units.

Layer Initialization Picture (LIP)

In some coding schemes, a layer initialization picture ("LIP picture") may be defined as a picture that is an IRAP picture that has a NoRaslOutputFlag flag (e.g., a flag that indicates that RASL pictures are not to be output if set to 1 and indicates that RASL pictures are to be output if set to 0) set to 1 or a picture that is contained an initial IRAP access unit, which is an IRAP access unit in which the base layer picture (e.g., a picture having a layer ID of 0 or smallest layer ID defined in the bitstream) has the NoRaslOutputFlag set to 1.

In some embodiments, an SPS can be activated at each LIP picture. For example, each IRAP picture that has a NoRaslOutputFlag flag set to 1 or each picture that is contained in an initial IRAP access unit, a new SPS, which may be different (e.g., specifying different picture resolutions, etc.) from the SPS that was previously activated. However, in a case where the LIP picture is not an IRAP picture (e.g., any picture contained in an initial IRAP access unit) and the base layer picture in the initial IRAP access unit is an IDR picture with a flag NoClrasOutputFlag flag (e.g., a flag that indicates that cross-layer random access skip pictures are not to be output if set to 1 and indicates that cross-layer random access skip pictures are to be output if set to 0) set to 0, the LIP picture should not be allowed to activate a new SPS. If a new SPS is activated at such the LIP picture in such a case, particularly when the contents of the SPS RBSP of the new SPS is different from that of the SPS that was previously active prior to the initial IRAP access unit, there could be problems in differing picture resolutions and error resilience. For example, the new SPS may update the resolution and use temporal prediction to refer to pictures of different sizes.

Bumping and Flushing of Pictures

Pictures that are decoded (e.g., so that they can be displayed or used to predict other pictures) are stored in a DPB. The pictures that are to be output may be marked as "needed for output," and the pictures that are to be used to predict other pictures may be marked as "used for reference." Decoded pictures that are neither marked as "needed for output" nor as "used for reference" (e.g., pictures that were initially marked as "used for reference" or "needed for output" but subsequently marked as "not used for reference" or "not needed for output") may be present in the DPB until they are removed by the decoding process. In output order conformant decoders, the process of removing pictures from the DPB often immediately follows the output of pictures that are marked as "needed for output." This process of output and subsequent removal may be referred to as "bumping."

There are also situations where the decoder may remove the pictures in the DPB without output, even though these pictures may be marked as "needed for output." For ease of description herein, decoded pictures that are present in the DPB at the time of decoding an IRAP picture (regardless of whether the decoded pictures are marked as "needed for output" or "used for reference") are referred to as "lagging DPB pictures" associated with the IRAP picture or "associated lagging DPB pictures" of the IRAP picture. Some examples of such situations, in the HEVC context, are described below.

In one example, when a CRA picture with NoRaslOutputFlag equal to a value of "1" is present in the middle of a bitstream (e.g., not the first picture in the bitstream), the lagging DPB pictures associated with the CRA picture would not be output and would be removed from the DPB. Such situations are likely to occur at splice points, where two bitstreams are joined together and the first picture of the latter bitstream is a CRA picture with NoRaslOutputFlag equal to a value of "1". In another example, when an IRAP picture picA that has NoRaslOutputFlag equal to a value of "1" and that is not a CRA picture (e.g., an IDR picture) is present in the middle of a bitstream and the resolution of the picture changes at picA (e.g., with the activation of a new SPS), the associated lagging DPB pictures of picA may be removed from the DPB before they can be output, because if the associated lagging DPB pictures continue to occupy the DPB, decoding of the pictures starting from picA may become problematic, for example, due to buffer overflow. In this case, the value of no_output_of_prior_pics_flag (e.g., a flag that indicates that pictures that were previously decoded and stored in the DPB should be removed from the DPB without being output if set to 1, and indicates that pictures that were previously decoded and stored in the DPB should not be removed from the DPB without being output if set to 0) associated with picA should be set equal to a value of "1" by the encoder or splicer, or NoOutputOfPriorPicsFlag (e.g., a derived value that may be determined based on the information included in the bitstream) may be derived to be equal to a value of "1" by the decoder, to flush the lagging pictures without output out of the DPB. The splicing operation is described further below with respect to FIG. 4.

Figure 4:
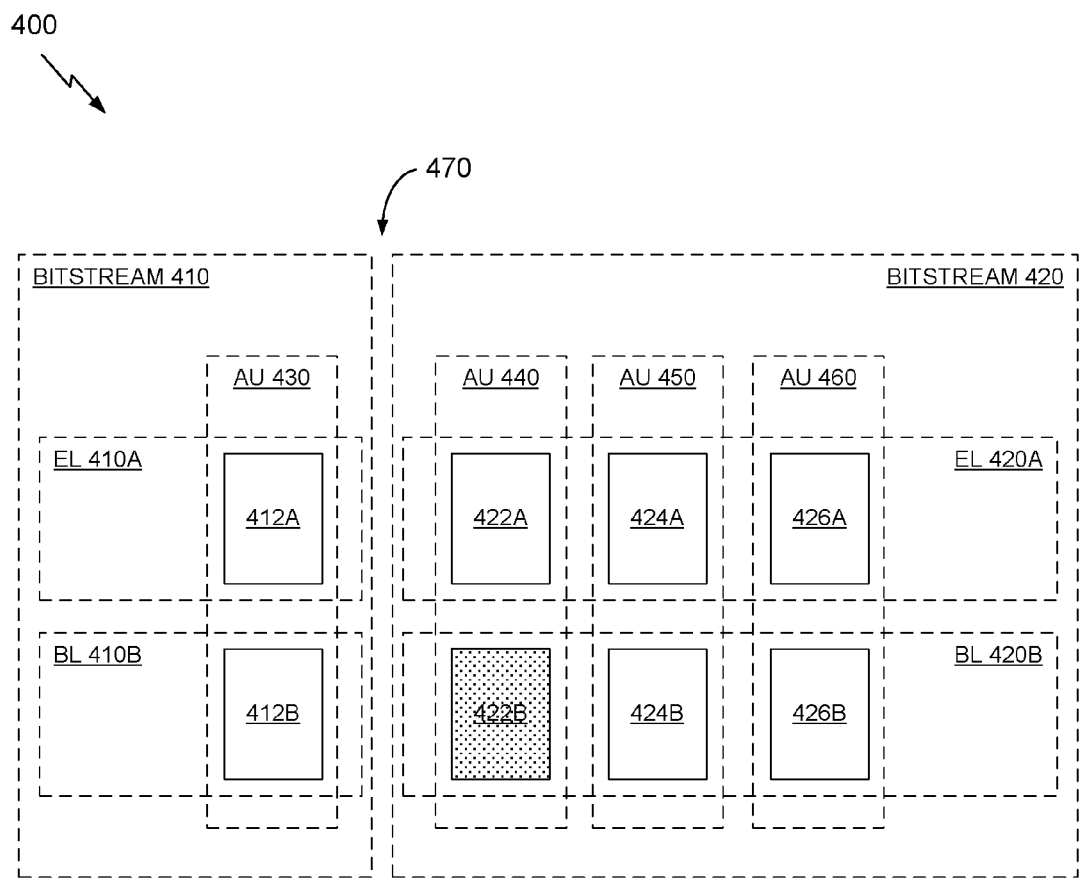
FIG. 4 is a block diagram illustrating an example configuration of pictures in different layers, according to one embodiment of the present disclosure.

This process of removing associated lagging DPB pictures from the DPB without output may be referred to as "flushing." Even in situations not described above, an IRAP picture may specify the value of no_output_of_prior_pics_flag equal to a value of "1", so that the decoder will flush the associated DPB lagging pictures of the IRAP picture.
Bitstream Including a Splice Point With reference to FIG. 4, an example bitstream having a splice point will be described. FIG. 4 shows a multi-layer bitstream 400 created by splicing bitstreams 410 and 420. The bitstream 410 includes an enhancement layer (EL) 410A and a base layer (BL) 410B, and the bitstream 420 includes an EL 420A and a BL 420B. The EL 410A includes an EL picture 412A, and the BL 410B includes a BL picture 412B. The EL 420A includes EL pictures 422A, 424A, and 426A, and the BL 420B includes BL pictures 422B, 424B, and 426B. The multi-layer bitstream 400 further includes access units (AUs) 430-460. The AU 430 includes the EL picture 412A and the BL picture 412B, the AU 440 includes the EL picture 422A and the BL picture 422B, the AU 450 includes the EL picture 424A and the BL picture 424B, and the AU 460 includes the EL picture 426A and the BL picture 426B. In the example of FIG. 4, the BL picture 422B is an IRAP picture, and the corresponding EL picture 422A in the AU 440 is a trailing picture (e.g., a non-IRAP picture), and consequently, the AU 440 is a non-aligned IRAP AU. Also, it should be noted that the AU 440 is an access unit that immediately follows a splice point 470.

Although the example of FIG. 4 illustrates a case where two different bitstreams are joined together, in some embodiments, a splice point may be present when a portion of the bitstream is removed. For example, a bitstream may have portions A, B, and C, portion B being between portions A and C. If portion B is removed from the bitstream, the remaining portions A and C may be joined together, and the point at which they are joined together may be referred to as a splice point. More generally, a splice point as discussed in the present application may be deemed to be present when one or more signaled or derived parameters or flags have predetermined values. For example, without receiving a specific indication that a splice point exists at a particular location, a decoder may determine the value of a flag (e.g., NoClrasOutputFlag), and perform one or more techniques described in this application based on the value of the flag.
Flushing of Pictures in Multi-Layer Context The process of flushing pictures is also relevant in multi-layer bitstreams. More specifically, it is relevant to all pictures that belong to an initial IRAP access unit, and also to IRAP pictures that are not in an initial IRAP access unit. As described above, in some existing implementations such as SHVC and MV-HEVC, an IRAP access unit may be defined as an access unit containing an IRAP picture that has nuh_layer_id equal to a value of "0" (regardless of whether other pictures in the access unit are IRAP pictures), and an initial IRAP access unit may be defined as an access unit containing an IRAP picture that has nuh_layer_id equal to a value of "0" and that has NoRaslOutputFlag equal to a value of "1" (again regardless of whether other pictures in the access unit are IRAP pictures).

With the possibility of having non-aligned IRAP pictures in access units (e.g., an access unit may contain both IRAP pictures and non-IRAP pictures) in SHVC and MV-HEVC, the situations described in the previous section in the context of HEVC can occur in different layers of an SHVC/MV-HEVC bitstream. For example, a CRA picture picA that has NoRaslOutputFlag equal to a value of "1" may be present at an enhancement layer in the middle of a bitstream (e.g., not in the first access unit of the bitstream) that starts with an initial IRAP access unit that does not have a CRA picture in the same layer as picA. Also, the resolution change of a picture could occur at IRAP pictures in an enhancement layer at an access unit where the resolution of the base layer does not change, or vice versa. Similar situations may arise for different DPB sizes.
Flushing of Pictures in SVC and MVC Due to the single-loop coding design of SVC, only one reconstructed picture per access unit is inserted in the DPB, except for cases when the so-called medium-granular scalability (MGS) is in use (in which case there can be two decoded pictures from the so-called key-picture access units that are stored in the DPB). However, in each access unit only the decoded picture of the highest layer may be output. Operations for managing the DPB, including the flushing of pictures, therefore, only concern pictures in the highest layer, mainly because a decoded picture of a base layer is not required to be present in the DPB in order to predict the enhancement layer.

In MVC, more than one view may be target output view, and decoded view components need to be maintained to predict view components in other layer, even if they are not needed to predict view components in the same layer. Therefore, view components from more than one view may be present in the DPB. The flag no_output_of_prior_pics_flag is signaled for each IDR view component (e.g., an IDR view component of a non-base view is signaled with non_idr_flag equal to a value of "0"), and the flushing of view components is layer-specific (or view-specific). In MVC, for simplicity, the IDR view components in an access unit in MVC are aligned. For example, if one view component in an access unit is an IDR view component, all the view components in that access unit are also IDR view components. Hence, flushing operation is also performed across all views in the bitstream, even though the operation may be view/layer-specific.

Output Timing Conformance

In some implementations (e.g., SHVC, MV-HEVC, etc.), such as MV-HEVC Working Draft (WD) 7, the output and removal of pictures from the DPB for output timing conformance are performed as described below. Similar or same concepts can apply to SHVC, and have been reflected or are to be reflected in Working Drafts of SHVC subsequent to Working Draft 5.

TABLE 1

Output Timing Conformance in MV-HEVC WD 7

C.3.2 Removal of pictures from the DPB
When the current picture is not picture 0 in the current layer, the removal of pictures in the current layer, with nuh_layer_id equal to currLayerId, from the DPB before decoding of the current picture, i.e. picture n, but after parsing the slice header of the first slice of the current picture, happens instantaneously at the CPB removal time of the first decoding unit of the current picture and proceeds as follows:
    The decoding process for RPS as specified in subclause 8.3.1 is invoked.
    When the current picture is an IRAP picture with NoRaslOutputFlag equal to 1, or the base layer
    picture in the current access unit is an IRAP picture with NoRaslOutputFlag equal to 1 and
    NoClrasOutputFlag is equal to 1, the following ordered steps are applied:
        1. The variable NoOutputOfPriorPicsFlag is derived for the decoder under test as follows:
            If the current picture is a CRA picture with NoRaslOutputFlag equal to 1,
            NoOutputOfPriorPicsFlag is set equal to 1 (regardless of the value of
            no_output_of_prior_pics_flag).
            Otherwise, if the current picture is an IRAP picture with NoRaslOutputFlag equal to 1 and
            the value of pic_width_in_luma_samples, pic_height_in_luma_samples,
            chroma_format_idc, bit_depth_luma_minus8, bit_depth_chroma_minus8, or
            sps_max_dec_pic_buffering_minus1[ HighestTid ] derived from the active SPS for the
            current layer is different from the value of pic_width_in_luma_samples,
            pic_height_in_luma_samples, chroma_format_idc, bit_depth_luma_minus8,
            bit_depth_chroma_minus8, or sps_max_dec_pic_buffering_minus1[ HighestTid ],
            respectively, derived from the SPS that was active for the current layer when decoding the
            preceding picture in the current layer, NoOutputOfPriorPicsFlag may (but should not) be set
            to 1 by the decoder under test, regardless of the value of no_output_of_prior_pics_flag.
              NOTE - Although setting NoOutputOfPriorPicsFlag equal to
              no_output_of_prior_pics_flag is preferred under these conditions, the decoder under
              test is allowed to set NoOutputOfPriorPicsFlag to 1 in this case.
            Otherwise, if the current picture is an IRAP picture with NoRaslOutputFlag equal to 1,
            NoOutputOfPriorPicsFlag is set equal to no_output_of_prior_pics_flag.
            Otherwise (the current picture is not an IRAP picture with NoRaslOutputFlag equal to 1, the
            base layer picture in the current access unit is an IRAP picture with NoRaslOutputFlag
            equal to 1, and NoClrasOutputFlag is equal to 1), NoOutputOfPriorPicsFlag is set equal to
            1.
        2. The value of NoOutputOfPriorPicsFlag derived for the decoder under test is applied for the
        HRD, such that when the value of NoOutputOfPriorPicsFlag is equal to 1, all picture storage
        buffers that contain pictures with nuh_layer_id equal to currLayerId in the sub-DPB are emptied
        without output of the pictures they contain, and the DPB fullness is decremented by the number
        of picture storage buffers that were emptied.
When both of the following conditions are true for any pictures k in the DPB, all such pictures k in
the DPB are removed from the DPB:
    picture k is marked as "unused for reference"
    picture k has PicOutputFlag equal to 0 or its DPB output time is less than or equal to the CPB
    removal time of the first decoding unit (denoted as decoding unit m) of the current picture n; i.e.
    DpbOutputTime[ k ] is less than or equal to CpbRemovalTime( m )
For each picture that is removed from the DPB, the DPB fullness is decremented by one.

Output Order Conformance

In some implementations (e.g., SHVC, MV-HEVC, etc.), the output and removal of pictures from the DPB for output order conformance are performed as described below. In the example below, the removal of pictures, when invoked, is layer-specific.

TABLE 2

Output Order Conformance in MV-HEVC WD 7

C.5.2.2. Output and removal of pictures from the DPB
When the current picture is not picture 0 in the current layer, the output and removal of pictures in the current layer, with nuh_layer_id equal to currLayerId, from the DPB before the decoding of the current

TABLE 2-continued

Output Order Conformance in MV-HEVC WD 7 picture , i.e. picture n, but after parsing the slice header of the first slice of the current picture and before the invocation of the decoding process for picture order count, happens instantaneously when the first decoding unit of the current picture is removed from the CPB and proceeds as follows:
   When the current picture is a POC resetting picture, all pictures in the DPB that do not belong to the
   current access unit and that are marked as "needed for output" are output, starting with pictures with
   the smallest value of PicOrderCntVal of all pictures excluding those in the current access unit in the
   DPB, in ascending order of the PicOrderCntVal values, and pictures with the same value of
   PicOrderCntVal are output in ascending order of the nuh_layer_id values. When a picture is output, it
   is cropped using the conformance cropping window specified in the active SPS for the picture, the
   cropped picture is output, and the picture is marked as "not needed for output".
   The decoding processes for picture order count and RPS are invoked. When decoding a CVS
   conforming to one or more of the profiles specified in Annex A using the decoding process specified
   in clauses 2 through 10, the decoding processes for picture order count and RPS that are invoked are
   as specified in subclauses 8.3.1and 8.3.2, respectively. When decoding a CVS conforming to one or
   more of the profiles specified in Annex G or H using the decoding process specified in Annex F, and
   Annex G or H, the decoding processes for picture order count and RPS that are invoked are as
   specified in subclauses F.8.3.1 and F.8.3.2, respectively.
   If the current picture is an IRAP picture with NoRaslOutputFlag equal to 1, or the base layer picture
   in the current access unit is an IRAP picture with NoRaslOutputFlag equal to 1 and
      NoClrasOutputFlag is equal to 1, the following ordered steps are applied:
      1. The variable NoOutputOfPriorPicsFlag is derived for the decoder under test as follows:
         If the current picture is a CRA picture with NoRaslOutputFlag equal to 1,
         NoOutputOfPriorPicsFlag is set equal to 1 (regardless of the value of
         no_output_of_prior_picsflag).
         Otherwise, if the current picture is an IRAP picture with NoRaslOutputFlag equal to 1 and
         the value of pic_width_in_luma_samples, pic_height_in_luma_samples,
         chroma_format_idc, bit_depth_luma_minus8, bit_depth_chroma_minus8, or
         sps_max_dec_pic_buffering_minus1[ HighestTid ] derived from the active SPS for the
         current layer is different from the value of pic_width_in_luma_samples,
         pic_height_in_luma_samples, chroma_format_idc, bit_depth_luma_minus8,
         bit_depth_chroma_minus8, or sps_max_dec_pic_buffering_minus1[ HighestTid ],
         respectively, derived from the SPS that was active for the current layer when decoding the
         preceding picture in the current layer, NoOutputOfPriorPicsFlag may (but should not) be set
         to 1 by the decoder under test, regardless of the value of no_output_of_prior_pics_flag.
            NOTE - Although setting NoOutputOfPriorPicsFlag equal to no_output_of_prior_pics_flag is
            preferred under these conditions, the decoder under test is allowed to set
            NoOutputOfPriorPicsFlag to 1 in this case.
         Otherwise, if the current picture is an IRAP picture with NoRaslOutputFlag equal to 1,
         NoOutputOfPriorPicsFlag is set equal to no_output_of_prior_pics_flag.
         Otherwise (the current picture is not an IRAP picture with NoRaslOutputFlag equal to 1, the
         base layer picture in the current access unit is an IRAP picture with NoRaslOutputFlag
         equal to 1, and NoClrasOutputFlag is equal to 1), NoOutputOfPriorPicsFlag is set equal to 1.
      2. The value of NoOutputOfPriorPicsFlag derived for the decoder under test is applied for the HRD
      as follows:
         If NoOutputOfPriorPicsFlag is equal to 1, all picture storage buffers that contain pictures
         with nuh_layer_id equal to currLayerId in the sub-DPB are emptied without output of the
         pictures they contain, and the sub-DPB fullness is decremented by the number of picture
         storage buffers that were emptied.
         Otherwise (NoOutputOfPriorPicsFlag is equal to 0), all picture storage buffers containing a
         picture that is marked as "not needed for output" and "unused for reference" are emptied
         (without output), and all non-empty picture storage buffers that contain pictures with
         nuh_layer_id equal to currLayerId in the sub-DPB are output by repeatedly invoking the
         "bumping" process specified in subclause C.5.2.4 until all these pictures are marked as "not
         needed for output", all pictures that have nuh_layer_id equal to currLayerId in the sub-DPB
         are emptied, and the sub-DPB fullness is decremented by the number of picture storage
         buffers emptied.

Signaling of Flag Indicating Output of Prior Pictures

In some embodiments, the variable NoOutputOfPriorPicsFlag (e.g., a value derived by the decoder to determine, when decoding an IRAP picture, whether or not to output the pictures in the DPB before the DPB is flushed) is derived based on no_output_of_prior_pics_flag and other conditions. For example, no_output_of_prior_pics_flag may be a value that is signaled in the bitstream, whereas NoOutputOfPriorPicsFlag may be a value derived by an encoder based on the information included in the bitstream. A decoder may derive the value of NoOutputOfPriorPicsFlag based on the value of no_output_of_prior_pics_flag and other conditions, and then use the derived value of NoOutputOfPriorPicsFlag to determine whether to output pictures or not. In some embodiments, the flag NoOutputOfPriorPicsFlag may indicate whether the current access unit comprises a splice point, at which two different bitstreams are stitched together.

In some embodiments, NoClRasOutputFlag and NoRaslOutputFlag may be variables derived based on the information included in the bitstream. For example, NoRaslOutputFlag may be derived for every IRAP picture (e.g., in BL and/or EL), and NoClRasOutputFlag may be derived only for the lowest layer pictures (e.g., BL pictures). The value of each of NoClRasOutputFlag and NoRaslOutputFlag may indicate that some pictures in the bitstream may not be correctly decodable due to the unavailability of certain reference pictures. Such unavailability of reference pictures may occur at random access points. Cross-layer random access skip (CL-RAS) pictures are, in some ways, the multi-layer equivalent of RASL pictures. If a decoder starts decoding a bitstream at a random access point (e.g., an access unit having a BL IRAP picture), and the EL picture in the access unit is not an IRAP picture, then that EL picture is a CL-RAS picture. All pictures in the EL may be CL-RAS pictures (e.g., decodable, but not correctly decodable) until an IRAP picture occurs in the EL. When such an EL IRAP picture is provided in the bitstream, the EL may be said to have been initialized.

For example, in the example of FIG. 4, the EL picture 422A may be a LIP picture that is not an IRAP picture, and the BL picture 422B may be an IRAP picture that has a flag NoClRasOutputFlag associated therewith. In this example, the value of NoOutputOfPriorPicsFlag associated with the EL picture 422A may be inferred based on the value of NoClRasOutputFlag associated with the BL picture 422B. For example, if NoClRasOutputFlag is equal to a value of "1", NoOutputOfPriorPicsFlag for the EL picture 422A may also be set to a value of "1", causing the pictures in the DPB to be not output before they are removed from the DPB. On the other hand, if NoClRasOutputFlag is equal to a value of "0", NoOutputOfPriorPicsFlag for the EL picture 422A may also be set to a value of "0", causing the pictures in the DPB to be removed from the DPB after output.

Improved Picture Flushing and DPB Parameter Inference for Multi-Layer Bitstreams IRAP pictures can provide random access points for decoding a bitstream. A decoder may start decoding a bitstream by decoding an IRAP picture without having to decode pictures that precede the IRAP picture. At the time of decoding an IRAP picture, the DPB may have a number of decoded pictures in the buffer. If outputting the existing pictures in the DPB would affect the performance of the decoder (e.g., too many pictures exist in the DPB for the decoder to output, outputting all pictures could result in uneven frame rate, etc.), it may be desirable to remove such existing pictures without outputting them (e.g., flush the existing pictures).

The variable NoOutputOfPriorPicsFlag can indicate, when decoding an IRAP picture, whether pictures in the DPB should be output prior to being removed from the DPB. For example, when decoding an IRAP picture, the value of NoOutputOfPriorPicsFlag can be set to 1 when the pictures in the DPB should not be output before being removed. The value of NoOutputOfPriorPicsFlag may be determined based on a corresponding syntax element and/or various conditions and information. For example, the value of NoOutputOfPriorPicsFlag may be determined based on at least the variable NoRaslOutputFlag and/or the variable NoClrasOutputFlag. The variable NoRaslOutputFlag can indicate whether a new coded video sequence (CVS) starts at the current access unit. The variable NoClrasOutputFlag can indicate whether a prediction boundary exists e.g., across all layers, at the current access unit.

In earlier versions developments, and/or discussions of SHVC and MV-HEVC (e.g., Working Draft 7 of MV-HEVC and also to be reflected in Working Drafts of SHVC subsequent to Working Draft 5), the flushing process is invoked for each layer when multiple layers or multiple views exist in a bitstream. For example, when an access unit auA in a bitstream has a base layer picture that is an IRAP picture with NoRaslOutputFlag equal to 1 and has NoClRasOutputFlag equal to 1, the respective value of NoOutputOfPriorPicsFlag for the IRAP picture in the base layer and for the enhancement layer pictures are derived. The pictures that precede the access unit auA in decoding order are then flushed. During this process, the pictures may be output based on the value of NoOutputOfPriorPicsFlag derived for the respective layer. If the access unit auA does not have pictures that belong to a layer in the list of layers to be decoded (e.g., TargetDecLayerIdList), then the pictures that precede the access unit auA in decoding order would not be flushed even though they are marked as "unused for reference." This is because flushing may be triggered only when there is a picture in the current AU for a particular layer. These lingering pictures could end up using the DPB memory and could result in buffer overflow when decoding subsequent pictures.

In order to address these and other challenges, the techniques according to certain aspects can provide several ways and/or embodiments for properly flushing pictures in the DPBs of different layers even when an AU may not include a picture in a particular layer. For instance, the flushing of DPBs for all layers can be triggered based on whether the base layer picture meets certain conditions. In one example, the flushing of DPBs for all layers can be triggered when the base layer picture is an IRAP picture that starts a new CVS (e.g., NoRaslOutputFlag=1), activates a new VPS, or defines a prediction boundary (e.g., NoClRasOutputFlag=1). By triggering the flushing of all layers based on the base layer picture, the techniques can invoke flushing for all layers in an AU even if a particular layer in that AU does not have a picture.

In addition, in earlier versions of SHVC and MV-HEVC (e.g., Working Draft 5 of SHVC and Working Draft 7 of MV-HEVC), any HEVC bitstream or any SHVC/MV-HEVC bitstream would be conformant to one or more profiles in Annex A and one or more profiles in Annex G or H. For example, a HEVC bitstream would conform to a profile in Annex A. A SHVC/MV-HEVC bitstream would conform to a profile in Annex G or H; the base layer in a SHVC/MV-HEVC bitstream generally also conforms to Annex A for backward compatibility. In addition, even the SHVC/MV-HEVC bitstream itself may conform to a profile in Annex A. Accordingly, when bitstreams are decoded using these Annexes in the standard, the DPB parameters to be used are either ambiguous or unavailable. Moreover, the DPB parameters signaled in the VPS extension are neither signaled nor inferred for the 0-th output layer set, where the layer set only comprises the base layer and only the base layer pictures are output.

In order to address these and other challenges, the techniques according to certain aspects can set various attributes in the active SPS of the base layer to be equal to the corresponding maximum values allowed for the various attributes. For example, the SPS can include various DPB parameters, such as MaxLayerDecPicBuffMinus1, MaxNumReorderPics, MaxLatencyIncreasePlus1, MaxLatencyPictures, and MaxDecPicBufferingMinus1. Or the maximum values for various attributes are set equal to the values of the various attributes of the active SPS. By setting the values of the various attributes of the active SPS equal to the maximum values allowed for the various attributes, the techniques can reduce or eliminate the ambiguity in or unavailability of DPB parameters to be applied.

Certain details relating to picture flushing and DPB parameter inference for multi-layer bitstreams are explained further below. Various terms used throughout this disclosure are broad terms having their ordinary meaning. In addition, in some embodiments, certain terms relate to the following video concepts. A coded video sequence can refer to a sequence of access units that include, in decoding order, an initial IRAP access unit, followed by zero or more access units that are not initial IRAP access units, including all subsequent access units up to but not including any subsequent access unit that is an initial IRAP access unit. A prediction boundary can refer to a picture (e.g., picA) for which any picture that succeeds the picture (picA) in decoding order, inclusive, does not refer to any picture that precedes the picture (picA) in decoding order, or for which pictures preceding the picture (picA) in decoding order are unavailable. According to certain aspects, defining a prediction boundary at the current AU may refer to defining a prediction boundary across all layers in the current AU. For instance, if an IRAP picture in a reference layer defines a prediction boundary at the current AU, the reference layer IRAP picture defines a prediction boundary across all layers in the AU, and pictures in the current AU may not refer to any pictures before the current AU. In certain cases, a splice point can be an example of a prediction boundary. External means may refer to any apparatus or entity that is not a part of an encoder or a decoder but interacts with the encoder or the decoder, e.g., through an application programming interface (API). In certain embodiments, external means may also be referred to as an external apparatus.

Picture Flushing for Multi-Layer Bitstreams

The techniques according to certain aspects can provide several embodiments of picture flushing for an IRAP picture as described. All embodiments described in this disclosure may be implemented separately, or in combination with one another. Additional signaling may be included in various parameter sets in the bitstream including, but not limited to, video VPS, SPS, and PPS, and may also be included in slice headers or SEI messages, and may even be specified by external means.

Embodiment 1

When the base layer IRAP picture with NoRaslOutputFlag equal to 1 activates a new VPS or has NoClrasOutputFlag equal to 1, the picture removal process during flushing operation is applied on all layers. When the base layer IRAP picture with NoRaslOutputFlag equal to a first value (e.g., 0 or 1) and it does not activate a new VPS and has NoClrasOutputFlag equal to 0, the picture removal process during flushing operation is only applied to the base layer pictures.

In this embodiment, when the base layer IRAP picture that starts a new CVS activates a new VPS or defines a prediction boundary at the current AU, the picture removal process during flushing operation is applied to all layers. When the base layer IRAP picture that starts a new CVS does not activate a new VPS and does not define a prediction boundary at the current AU, the picture removal process during flushing operation is only applied to the base layer pictures.

In this way, flushing of the DPB is triggered for all layers based on the base layer IRAP picture and values of the variables associated with the base layer IRAP picture, such as NoRaslOutputFlag and NoClrasOutputFlag, instead of being triggered for each layer separately. In the earlier approach, the flushing was triggered based on the presence of a picture in a particular layer. Picture removal and picture output can be handled separately, which can simplify the flushing process.

Embodiment 2

The processes related to NoOutputOfPriorPicsFlag are defined for the lowest layer in the bitstream, and the value of NoOutputOfPriorPicsFlag may be externally provided to the decoder or derived.
For example, Embodiment 1 can be changed to indicate:
"When the lowest layer IRAP picture with NoRaslOutputFlag equal to 1 activates a new VPS or has NoClrasOutputFlag equal to 1, the picture removal process during flushing operation is applied on all layers. When the lowest layer IRAP picture with NoRaslOutputFlag equal to a first value (e.g., 0 or 1) and it does not activate a new VPS and has NoClrasOutputFlag equal to 0, the picture removal process during flushing operation is only applied to the lowest layer pictures.

This embodiment can be implemented in combination with Embodiment 1 above. Embodiment 1 is explained above with reference to a base layer IRAP picture, but Embodiment 2 can extend the technique of Embodiment 1 to the lowest layer that might not be the base layer. The lowest layer can refer to a layer that has the lowest layer ID in the current AU. The variable nuh_layer_id can indicate the layer ID of a layer. For instance, the layer ID of a base layer is 0. In a bitstream that has no base layer picture (layer 0), but has layer 1 and layer 2 pictures, the picture flushing process is triggered based on layer 1 since it has the lowest layer ID other than 0 and therefore is the lowest layer.

This embodiment can accommodate scenarios in which the current AU does not have a base layer picture, but has pictures in other layers. Such cases could occur when the base layer decoded pictures are externally provided, when the base layer could be decoded using a different codec or standard, or when the lowest layer in the bitstream is an independently decodable layer. Accordingly, the flushing process can be more flexible and support different types of bitstreams and splicing scenarios. In certain embodiments, the value of NoOutputOfPriorPicsFlag is provided by external means or an external apparatus. For example, the external means or external apparatus can decode the base layer and determine the value of NoOutputOfPriorPicsFlag.

Embodiment 3

NoOutputOfPriorPicsFlag is not derived for pictures that have nuh_layer_id greater than 0.
Alternatively NoOutputOfPriorPicsFlag is not derived for pictures that belong to any dependent layer, and NoOutputOfPriorPicsFlag is derived for pictures that belong to independent layers.

In this embodiment, the value of NoOutputOfPriorPicsFlag is not derived for pictures that have layer ID greater than 0 (e.g., the base layer). For instance, the value of NoOutputOfPriorPicsFlag is derived for only pictures in the base layer. In many cases, the base layer (e.g., the layer with nuh_layer_id equal to 0) is a layer on which all the other layers are dependent. In such cases, the decision to derive the value of NoOutputOfPriorPicsFlag for layers with nuh_layer_id greater than 0 may not be helpful since output or non-output operations associated with that access unit would have been performed when NoOutputOfPriorPicsFlag was derived for the base layer. Not deriving the value of NoOutputOfPriorPicsFlag for layers with nuh_layer_id greater than 0 can reduce decoder operations.

Or NoOutputOfPriorPicsFlag is not derived for pictures that are from a dependent layer. NoOutputOfPriorPicsFlag is derived for pictures that are from an independent layer. A dependent layer can refer to a layer containing a picture that may use a picture from another layer for reference. In some case, dependent layers may be those layers that are indicated based on the dependency information of layers signaled in the VPS. An independent layer can refer to a layer that may not use picture from another layer for reference.

Embodiment 4

When an access unit auA contains a base layer picture that is IRAP with NoRaslOutputFlag equal to 1 and NoClrasOutputFlag equal to 1, all the pictures in the DPB that precede, in decoding order, this auA are output dependent on the value of NoOutputOfPriorPicsFlag of the base layer picture in auA, and then flushed from the DPB.

In this embodiment, when the base layer IRAP picture in the current AU starts a new CVS and defines a prediction boundary at the current AU, all pictures in the DPB that precede the current AU in decoding order are output based on the value of NoOutputOfPriorPicsFlag of the base layer IRAP picture, then flushed from the DPB. By making the decision of output of any layer based on the value of NoOutputOfPriorPicsFlag at the base layer IRAP picture when the current AU starts a new CVS and defines a prediction boundary at the current AU, pictures that precede the current AU in all layers may be processed (e.g., output or not output) even if the current AU does not have a picture at the particular layer.

Embodiment 5

All pictures that are marked as "needed for output" preceding an IRAP picture in the base layer that has NoRaslOutputFlag equal to 1 are output if the value of NoOutputOfPriorPicsFlag is equal to 0 in output-order conformant decoders.

In this embodiment, when the base layer IRAP picture defines a prediction boundary at the current AU, all pictures that are marked as "needed for output" that precede the base layer IRAP picture are output if the value of NoOutputOfPriorPicsFlag is equal to 0 (e.g., prior pictures should be output). This embodiment applies to output order conformant decoders, but may also be extended to other types of decoders, such as output time conformant decoders. The advantages of this embodiment can be similar to those of the embodiments above.

Embodiment 6

When an access unit auA contains a base layer picture that is IRAP with NoRaslOutputFlag equal to 1 and NoClrasOutputFlag equal to 1, all the pictures in the DPB that precede, in decoding order, this auA are flushed without output.

In this embodiment, when a base layer IRAP picture starts in the current AU a new CVS and defines a prediction boundary, all pictures in the DPB that precede the current AU are flushed without output. The advantages of this embodiment can be similar to those of the embodiments above.

Embodiment 7

When an access unit (AU) contains a base layer picture that is IRAP with NoRaslOutputFlag equal to 1 and NoClrasOutputFlag equal to 1, all the pictures in the enhancement layers in the DPB that precede, in decoding order, this AU are flushed without output, and the pictures in the base layer that precede, in decoding order, the access unit are first output dependent on the value of NoOutputOfPriorPicsFlag of the base layer picture and then flushed.

In this embodiment, when the base layer IRAP picture in the current AU starts a new CVS and defines a prediction boundary, all the pictures in the enhancement layers in the DPB that precede the current AU in decoding order are removed without output, and the pictures in the base layer that precede the current AU in decoding order are output based on the value of NoOutputOfPriorPicsFlag and then removed.

Embodiment 8

When an access unit (AU) auA contains a base layer picture that is IRAP with NoRaslOutputFlag equal to 1 and NoClrasOutputFlag equal to 1, all the pictures that precede, in decoding order, this AU and are contained in the enhancement layers that do not have a picture in access unit auA are flushed without output, and the pictures that precede, in decoding order, the access unit auA and belong to those layers that do have a picture in the access unit auA are first output dependent on the value of NoOutputOfPriorPicsFlag of the corresponding layer and then flushed.

In this embodiment, when the base layer IRAP picture in the current AU starts a new CVS and defines a prediction boundary, all the pictures that precede the current AU in decoding order and belong to the enhancement layers that do not have a picture in the current AU are removed without output, and the pictures that precede the current AU in decoding order and belong to layers that have a picture in the current AU are output based on the value of NoOutputOfPriorPicsFlag and then removed.

Embodiment 9

The syntax element no_output_of_prior_pics_flag is not signaled for pictures that have nuh_layer_id greater than 0.

In this embodiment, the syntax element no_output_of_prior_pics_flag is not signaled for pictures that are not in the base layer. The syntax element no_output_of_prior_pics_flag can indicate the value of the variable NoOutputOfPriorPicsFlag. The value of NoOutputOfPriorPicsFlag can be set equal to the value of the syntax element no_output_of_prior_pics_flag, or derived or inferred based on various conditions and/or algorithm, depending on the embodiment. The number of bits used to transmit pictures may be reduced by not signaling the syntax element no_output_of_prior_pics_flag for pictures that do not belong to the base layer.

Embodiment 10

The syntax element no_output_of_prior_pics_flag is not signaled for pictures that belong to dependent layers.

In this embodiment, the syntax element no_output_of_prior_pics_flag is not signaled for pictures that belong to dependent layers, for example, layers that refer to other layers. The number of bits used to transmit pictures may be reduced by not signaling the syntax element no_output_of_prior_pics_flag for pictures that belong to dependent layers.

Embodiment 11

The syntax element no_output_of_prior_pics_flag is only signaled in those enhancement layer pictures that have no direct reference layers.
In another alternative, the syntax element no_output_of_prior_pics_flag is signaled in all IRAP pictures and the value of no_output_of_prior_pics_flag is constrained to be the same across all the IRAP pictures in an access unit.
In another alternative, the value of NoOutputOfPriorPicsFlag, when derived, inferred or externally provided, is constrained to be the same across all the pictures in an access unit.

In this embodiment, the syntax element no_output_of_prior_pics_flag is only signaled in the enhancement layer pictures that have no direct reference layers. Or the syntax element no_output_of_prior_pics_flag is signaled in all IRAP pictures, and the value of no_output_of_prior_ pics_flag is constrained to be the same across all the IRAP pictures in an AU. Or when the value of NoOutputOfPriorPicsFlag is derived, inferred, or externally provided, the value of NoOutputOfPriorPicsFlag is constrained to be the same across all the pictures in an AU. The number of bits used to transmit the pictures may be reduced by not signaling the syntax element no_output_of_prior_pics_flag for pictures that belong to layers for which the value of NoOutputOfPriorPicsFlag is derived.

Additional embodiments for picture flushing for an IRAP picture are provided below. The below embodiments may each be a detailed implementation of the embodiments described above. The example embodiments are provided in the context of earlier versions of SHVC and MV-HEVC (e.g., SHVC WD 5 and/or MV-HEVC WD 7). Additions to the earlier versions of SHVC and MV-HEVC are indicated in italics, and deletions from the earlier versions of MV-HEVC are indicated in strikethrough. Section C.3.2 describes the output timing DPB operations on picture removal in MV-HEVC WD 7. Section C.5.2.2 describes the output order DPB operations on picture removal in MV-HEVC WD 7. Similar or same concepts and/or text are applicable to SHVC, and have been reflected or are to be reflected in Working Drafts of SHVC subsequent to WD 5. Accordingly, the example embodiments are also applicable to SHVC.

Example Embodiment A

Example Embodiment A relates to Embodiment 1 above and can be a detailed implementation of Embodiment 1. In this embodiment, the picture flushing is only invoked for base layer IRAP pictures. In output order conformant decoders, when NoOutputOfPriorPicsFlag is equal to 0, all pictures in all the sub-DPBs are output. A sub-DPB can refer to a DPB associated with an individual layer. A sub-DPB can include picture storage buffers of a DPB that are associated with an individual layer. For example, the base layer can have a sub-DPB within the DPB, and a corresponding enhancement layer can also have a sub-DPB within the DPB. In both output-order conformant and output-timing conformant decoders, when the base layer picture has NoClrasOutputFlag equal to 1 or activates a new VPS, all the pictures from all the sub-DPBs are removed after determining the output behavior based on NoOutputOfPriorPicsFlag. In both output-order conformant and output-timing conformant decoders, when the base layer picture has NoClrasOutputFlag equal to 0 and does not activate a new VPS, all the pictures that have nuh_layer_id equal to 0 are removed after determining the output behavior based on NoOutputOfPriorPicsFlag.

TABLE 3

Example Embodiment A

C.3.2 Removal of pictures from the DPB
When the current picture is not picture 0 in the current layer, the removal of pictures in the current layer, with nuh_layer_id equal to currLayerId, from the DPB before decoding of the current picture, i.e. picture n, but after parsing the slice header of the first slice of the current picture, happens instantaneously at the CPB removal time of the first decoding unit of the current picture and proceeds as follows:
    The decoding process for RPS as specified in subclause 8.3.1 is invoked.
    The variable crossLayerBufferEmptyFlag is derived as follows:
        If a new VPS is activated by the current access unit or the current picture is an IRAP picture with
        nuh_layer_id equal to 0, NoRaslOutputFlag equal to 1 and NoClrasOutputFlag equal to 1,
        crossLayerBufferEmptyFlag is set to 1.
        Otherwise, crossLayerBufferEmptyFlag is set to 0.
When the current picture is an IRAP picture with NoRaslOutputFlag equal to 1 ~~, or the base layer picture in the current access unit is an IRAP picture with NoRaslOutputFlag equal to 1 and NoClrasOutputFlag is equal to 1~~ and nuh_layer_id equal to 0, the following ordered steps are applied:
1. The variable NoOutputOfPriorPicsFlag is derived for the decoder under test as follows:
        If the current picture is a CRA picture ~~with NoRaslOutputFlag equal to 1~~, NoOutputOfPriorPicsFlag is set equal to 1 (regardless of the value of no_output_of_prior_pics_flag).
        Otherwise, if ~~the current price is an IRAP picture with NoRaslOutputFlag equal to 1 and~~ the value of pic_width_in_luma_samples, pic_height_in_luma_samples, chroma_format_idc, bit_depth_luma_minus8, bit_depth_chroma_minus8, or sps_max_dec_pic_buffering_minus1[ HighestTid ] derived from the active SPS for the current layer is different from the value of pic_width_in_luma_samples, pic_height_in_luma_samples, chroma format_ idc, bit_depth_luma_minus8, bit_depth_chroma_minus8, or sps_max_dec_pic_buffering_minus1[ HighestTid ], respectively, derived from the SPS that was active for the current layer when decoding the preceding picture in the current layer, NoOutputOfPriorPicsFlag may (but should not) be set to 1 by the decoder under test, regardless of the value of no_output_of_prior_pics_flag.
          NOTE - Although setting NoOutputOfPriorPicsFlag equal to no_output_of_prior_pics_flag is preferred under these conditions, the decoder under test is allowed to set NoOutputOfPriorPicsFlag to 1 in this case.
        Otherwise, ~~if the current picture is an IRAP picture with NoRaslOutputFlag equal to 1,~~ NoOutputOfPriorPicsFlag is set equal to no_output_of_prior_pics_flag.
        ~~Otherwise (the current picture is not an IRAP picture with NoRaslOutputFlag equal to 1, the base layer picture in the current access unit is an IRAP picture with NoRaslOutputFlag equal to 1, and NoClrasOutputFlag is equal to 1), NoOutputOfPriorPicsFlag is set equal to 1.~~
2. The value of NoOutputOfPriorPicsFlag derived for the decoder under test is applied for the HRD as follows: ~~, such that~~
        ~~w~~ When the value of NoOutputOfPriorPicsFlag is equal to 1 and the value of crossLayerBufferEmptyFlag is equal to 1, all non-empty picture storage buffers ~~that contain pictures with nuh_layer_id equal to currLayerId~~ in all the sub-DPBs are emptied without output of the pictures they contain, and the sub-DPB fullness of each sub-DPBs is set to 0 ~~decremented by the number of pictures storage buffers that were emptied.~~

TABLE 3-continued

Example Embodiment A

> When the value of NoOutputOfPriorPicsFlag is equal to 1 and the value of
> crossLayerBufferEmptyFlag is equal to 0, all non-empty picture storage buffers that contain
> pictures with nuh_layer_id equal to 0 are emptied without output of the pictures they
> contain, and the sub-DPB fullness of the sub-DPB associated with nuh_layer_id equal to 0 is
> decremented by the number of picture storage buffers that were emptied.

When both of the following conditions are true for any pictures k in the DPB, all such pictures k in
the DPB are removed from the DPB:
> picture k is marked as "unused for reference"
> picture k has PicOutputFlag equal to 0 or its DPB output time is less than or equal to the CPB
> removal time of the first decoding unit (denoted as decoding unit m) of the current picture n; i.e.
> DpbOutputTime[ k ] is less than or equal to CpbRemovalTime( m )

For each picture that is removed from the DPB, the DPB fullness is decremented by one.

C.5.2.1 Output and removal of pictures from the DPB

When the current picture is not picture 0 in the current layer, the output and removal of pictures in the
current layer, with nuh_layer_id equal to currLayerId, from the DPB before the decoding of the current
picture , i.e. picture n, but after parsing the slice header of the first slice of the current picture and before
the invocation of the decoding process for picture order count, happens instantaneously when the first
decoding unit of the current picture is removed from the CPB and proceeds as follows:

> When the current picture is a POC resetting picture, all pictures in the DPB that do not belong to the
> current access unit and that are marked as "needed for output" are output, starting with pictures with
> the smallest value of PicOrderCntVal of all pictures excluding those in the current access unit in the
> DPB, in ascending order of the PicOrderCntVal values, and pictures with the same value of
> PicOrderCntVal are output in ascending order of the nuh_layer_id values. When a picture is output, it
> is cropped using the conformance cropping window specified in the active SPS for the picture, the
> cropped picture is output, and the picture is marked as "not needed for output".

The decoding processes for picture order count and RPS are invoked. When decoding a CVS
conforming to one or more of the profiles specified in Annex A using the decoding process specified
in clauses 2 through 10, the decoding processes for picture order count and RPS that are invoked are
as specified in subclauses 8.3.1and 8.3.2, respectively. When decoding a CVS conforming to one or
more of the profiles specified in Annex G or H using the decoding process specified in Annex F, and
Annex G or H, the decoding processes for picture order count and RPS that are invoked are as
specified in subclauses F.8.3.1 and F.8.3.2, respectively.

The variable crossLayerBufferEmptyFlag is derived as follows:
> If a new VPS is activated by the current access unit or the current picture is IRAP picture with
> nuh_layer_id equal to 0, NoRaslOutputFlag equal to 1 and NoClrasOutputFlag equal to 1,
> crossLayerBufferEmptyFlag is set to 1.
> Otherwise, crossLayerBufferEmptyFlag is set to 0.

If the current picture is an IRAP picture with NoRaslOutputFlag equal to 1,~~, or the base layer picture in the current access unit is an IRAP picture with NoRaslOutputFlag equal to 1 and NoClrasOutputFlag is equal to 1~~ and nuh_layer_id equal to 0, the following ordered steps are applied:

1. The variable NoOutputOfPriorPicsFlag is derived for the decoder under test as follows:
> If the current picture is a CRA picture ~~with NoRaslOutputFlag equal to 1,~~
> NoOutputOfPriorPicsFlag is set equal to 1 (regardless of the value of
> no_output_of_prior_pics_flag).
>
> Otherwise, if ~~if the current picture is an IRAP picture with NoRaslOutputFlag equal to 1,~~
> the value of pic_width_in_luma_samples, pic_height_in_luma_samples,
> chroma_format_idc, bit_depth_luma_minus8, bit_depth_chroma_minus8, or
> sps_max_dec_pic_buffering_minus1[ HighestTid ] derived from the active SPS for the
> current layer is different from the value of pic_width_in_luma_samples,
> pic_height_in_luma_samples, chroma format_ idc, bit_depth_luma_minus8,
> bit_depth_chroma_minus8, or sps_max_dec_pic_buffering_minus1[ HighestTid ],
> respectively, derived from the SPS that was active for the current layer when decoding the
> preceding picture in the current layer, NoOutputOfPriorPicsFlag may (but should not) be set
> to 1 by the decoder under test, regardless of the value of no_output_of_prior_pics_flag.
>> NOTE - Although setting NoOutputOfPriorPicsFlag equal to no_output_of_prior_pics_flag is
>> preferred under these conditions, the decoder under test is allowed to set
>> NoOutputOfPriorPicsFlag to 1 in this case.
>
> Otherwise,~~if the current picture is an IRAP picture with NoRaslOutputFlag equal to 1,~~
> NoOutputOfPriorPicsFlag is set equal to no_output_of_prior_pics_flag.
>
> ~~Otherwise ( the current picture is not an IRAP picture with NoRaslOutputFlag equal to 1, the base layer picture in the current access unit is an IRAP picture with NoRaslOutputFlag equal to 1, and NoClrasOutputFlag is equal to 1), NoOutputOfPriorFlag is set equal to 1.~~

2. The value of NoOutputOfPriorPicsFlag derived for the decoder under test is applied for the HRD
as follows:
> If NoOutputOfPriorPicsFlag is equal to 0, all non-empty picture storage buffers in all the
> sub-DPBs are output by repeatedly invoking the "bumping" process specified in
> subclause C.5.2.4 until allthese pictures are marked as "not needed for output".
> If crossLayerBufferEmptyFlag ~~NoOutputOfPriorPicsFlag~~ is equal to 1, all picture storage
> buffers ~~that contain pictures with nuh_layer_id equal to currLayerId~~ in all the sub-DPBs are
> emptied, ~~without output of the pictures they contain,~~ and the sub-DPB fullness of all the sub-
> DPBs is set to 0 ~~decremented by the number of picture storage buffers that were emptied~~.
>
> Otherwise (crossLayerBufferEmptyFlag ~~NoOutputOfPriorPicsFlag~~ is equal to 0), all picture
> storage buffers containing a picture that is marked as "not needed for output" and "unused
> for reference" are emptied output), ~~and all non-empty picture storage buffers that contain pictures with nuh_layer_id equal to currLayerId in the sub-DPB are output by repeatedly invoking the "bumping" process specified in subclause C.5.2.4 until all these~~

TABLE 3-continued

Example Embodiment A

~~pictures are marked as "not needed for output"~~ all pictures that have nuh_layer_id equal to 0 ~~currLayerId~~ in the sub-DPB containing layer nuh_layer_id equal to 0 are emptied, and the sub-DPB fullness of each sub-DPB is decremented by the number of picture storage buffers emptied in that sub-DPB.
Otherwise, all picture storage buffers that contain a picture in the current layer and that are marked as not "needed for output" and "unused for reference" are emptied (without output). For each picture storage buffer that is emptied, the sub-DPB fullness is decremented by one. When one or more of the following conditions are true, the "bumping" process specified in subclause C.5.2.4 is invoked repeatedly until none of the following conditions are true:
    The number of access units that contain at least one decoded picture in the DPB marked as "needed for output" is greater than MaxNumReorderPics.
    MaxLatencyIncreasePlus1 is not equal to 0 and there is at least one access unit that contains at least one decoded picture in the DPB marked as "needed for output" for which the associated variable PicLatencyCount is greater than or equal to MaxLatencyPictures.
    The number of pictures in the sub-DPB is greater than or equal to MaxDecPicBufferingMinus 1 + 1.
    The number of pictures in the current layer in the sub-DPB is greater than or equal to MaxLayerDecPicBuffMinus 1 + 1.

Alternatively, as described with respect to Embodiment 2 above, for both output-order conformant and output-timing conformant decoders, the process related to NoOutputOfPriorPicsFlag described in Embodiment A is applied not to pictures in the base layer, but to pictures in the lowest layer in the bitstream (e.g., the layer in the bitstream with the smallest nuh_layer_id), and the value of NoOutputOfPriorPicsFlag may be provided externally to the decoder.

Example Embodiment B

In this embodiment, the earlier versions of SHVC and MV-HEVC are changed so that the value of NoOutputOfPriorPicsFlag is derived for enhancement non-IRAP pictures that are the first pictures to be decoded in each layer after decoding a base layer IRAP picture with NoClrasOutputFlag equal to 1. This embodiment can keep the existing design of SHVC/MV-HEVC and address the issue of removal of pictures from an enhancement layer that does not contain a picture at an access unit that has a base layer IRAP picture, by invoking the removal when the next picture in the enhancement layer is present.

Example Embodiment C

Example Embodiment C relates to Embodiment 6 above and can be a detailed implementation of Embodiment 6. In this embodiment, when a base layer IRAP picture starts a new CVS and defines a prediction boundary, all pictures in the DPB are flushed without output.

TABLE 4

Example Embodiment C

C.3.2 Removal of pictures from the DPB
When the current picture is not picture 0 in the current layer, the removal of pictures in the current layer, with nuh_layer_id equal to currLayerId, from the DPB before decoding of the current picture, i.e. picture n, but after parsing the slice header of the first slice of the current picture, happens instantaneously at the CPB removal time of the first decoding unit of the current picture and proceeds as follows:
    The decoding process for RPS as specified in subclause 8.3.1 is invoked.
    When the current picture is an IRAP picture with NoRaslOutputFlag equal to 1, or the base layer picture in the current access unit is an IRAP picture with NoRaslOutputFlag equal to 1 and NoClrasOutputFlag is equal to 1, the following ordered steps are applied:
        1. The variable NoOutputOfPriorPicsFlag is derived for the decoder under test as follows:
            If the current picture is a CRA picture with NoRaslOutputFlag equal to 1, NoOutputOfPriorPicsFlag is set equal to 1 (regardless of the value of no_output_of_prior_pics_flag).
           Otherwise, if the current picture is an IRAP picture with NoRaslOutputFlag equal to 1 and the value of pic_width_in_luma_samples, pic_height_in_luma_samples, chroma_format_idc, bit_depth_luma_minus8, bit_depth_chroma_minus8, or sps_max_dec_pic_buffering_minus1[ HighestTid ] derived from the active SPS for the current layer is different from the value of pic_width_in_luma_samples, pic_height_in_luma_samples, chroma_format_idc, bit_depth_luma_minus8, bit_depth_chroma_minus8, or sps_max_dec_pic_buffering_minus1[ HighestTid ], respectively, derived from the SPS that was active for the current layer when decoding the preceding picture in the current layer, NoOutputOfPriorPicsFlag may (but should not) be set to 1 by the decoder under test, regardless of the value of no_output_of_prior_pics_flag.
           NOTE - Although setting NoOutputOfPriorPicsFlag equal to no_output_of_prior_pics_flag is preferred under these conditions, the decoder under test is allowed to set NoOutputOfPriorPicsFlag to 1 in this case.
           Otherwise, if the current picture is an IRAP picture with NoRaslOutputFlag equal to 1, NoOutputOfPriorPicsFlag is set equal to no_output_of_prior_pics_flag.
           Otherwise (the current picture is not an IRAP picture with NoRaslOutputFlag equal to 1, the base layer picture in the current access unit is an IRAP picture with NoRaslOutputFlag equal to 1, and NoClrasOutputFlag is equal to 1), NoOutputOfPriorPicsFlag is set equal to 1.

TABLE 4-continued

Example Embodiment C

2. The picture storage buffers are emptied as follows.
    If the current picture is a IRAP picture with nuh_layer_id equal to 0, with
    NoRaslOutputFlag equal to 1 and NoClrasOutputFlag equal to 1, then all the picture
    storage buffers in all the sub-DPBs are emptied without output of pictures they contain and
    the sub-DPB fullness is set to zero for all the sub-DPBs.
    Otherwise, T̶h̶e̶ value of NoOutputOfPriorPicsFlag derived for the decoder under test is
    applied for the HRD, such that when the value of NoOutputOfPriorPicsFlag is equal to 1, all
    picture storage buffers that contain pictures with nuh_layer_id equal to currLayerId in the
    sub-DPB are emptied without output of the pictures they contain, and the DPB fullness is
    decremented by the number of picture storage buffers that were emptied.
When both of the following conditions are true for any pictures k in the DPB, all such pictures k in
the DPB are removed from the DPB:
    picture k is marked as "unused for reference"
    picture k has PicOutputFlag equal to 0 or its DPB output time is less than or equal to the CPB
    removal time of the first decoding unit (denoted as decoding unit m) of the current picture n; i.e.
    DpbOutputTime[ k ] is less than or equal to CpbRemovalTime( m )
  For each picture that is removed from the DPB, the DPB fullness is decremented by one.
C.5.2.2. Output and removal of pictures from the DPB
When the current picture is not picture 0 in the current layer, the output and removal of pictures in the
current layer, with nuh_layer_id equal to currLayerId, from the DPB before the decoding of the current
picture , i.e. picture n, but after parsing the slice header of the first slice of the current picture and before
the invocation of the decoding process for picture order count, happens instantaneously when the first
decoding unit of the current picture is removed from the CPB and proceeds as follows:
    When the current picture is a POC resetting picture, all pictures in the DPB that do not belong to the
    current access unit and that are marked as "needed for output" are output, starting with pictures with
    the smallest value of PicOrderCntVal of all pictures excluding those in the current access unit in the
    DPB, in ascending order of the PicOrderCntVal values, and pictures with the same value of
    PicOrderCntVal are output in ascending order of the nuh_layer_id values. When a picture is output, it
    is cropped using the conformance cropping window specified in the active SPS for the picture, the
    cropped picture is output, and the picture is marked as "not needed for output".
The decoding processes for picture order count and RPS are invoked. When decoding a CVS
conforming to one or more of the profiles specified in Annex A using the decoding process specified
in clauses 2 through 10, the decoding processes for picture order count and RPS that are invoked are
as specified in subclauses 8.3.1and 8.3.2, respectively. When decoding a CVS conforming to one or
more of the profiles specified in Annex G or H using the decoding process specified in Annex F, and
Annex G or H, the decoding processes for picture order count and RPS that are invoked are as
specified in subclauses F.8.3.1 and F.8.3.2, respectively.
If the current picture is an IRAP picture with NoRaslOutputFlag equal to 1, or the base layer picture
in the current access unit is an IRAP picture with NoRaslOutputFlag equal to 1 and
NoClrasOutputFlag is equal to 1, the following ordered steps are applied:
1. The variable NoOutputOfPriorPicsFlag is derived for the decoder under test as follows:
    If the current picture is a CRA picture with NoRaslOutputFlag equal to 1,
    NoOutputOfPriorPicsFlag is set equal to 1 (regardless of the value of
    no_output_of_prior_pics_flag).
    Otherwise, if the current picture is an IRAP picture with NoRaslOutputFlag equal to 1 and
    the value of pic_width_in_luma_samples, pic_height_in_luma_samples,
    chroma_format_idc, bit_depth_luma_minus8, bit_depth_chroma_minus8, or
    sps_max_decpic_buffering_minus1[ HighestTid ] derived from the active SPS for the
    current layer is different from the value of pic_width_in_luma_samples,
    pic_height_in_luma_samples, chroma_format_idc, bit_depth_luma_minus8,
    bit_depth_chroma_minus 8 , or sps_max_dec_pic_buffering_minus1[ HighestTid ],
    respectively, derived from the SPS that was active for the current layer when decoding the
    preceding picture in the current layer, NoOutputOfPriorPicsFlag may (but should not) be set
    to 1 by the decoder under test, regardless of the value of no_output_of_prior_pics_flag.
      NOTE - Although setting NoOutputOfPriorPicsFlag equal to no_output_of_prior_pics_flag is
      preferred under these conditions, the decoder under test is allowed to set
      NoOutputOfPriorPicsFlag to 1 in this case.
    Otherwise, if the current picture is an IRAP picture with NoRaslOutputFlag equal to 1,
    NoOutputOfPriorPicsFlag is set equal to no_output_of_prior_pics_flag.
    Otherwise (the current picture is not an IRAP picture with NoRaslOutputFlag equal to 1, the
    base layer picture in the current access unit is an IRAP picture with NoRaslOutputFlag
    equal to 1, and NoClrasOutputFlag is equal to 1), NoOutputOfPriorPicsFlag is set equal to
    1.
2. The value of NoOutputOfPriorPicsFlag derived for the decoder under test is applied for the HRD
    as follows:
    If the current picture is a IRAP picture with nuh_layer_id equal to 0, with
    NoRaslOutputFlag equal to 1 and NoClrasOutputFlag equal to 1, then all the picture
    storage buffers in all the sub-DPBs are emptied without output of pictures they contain and
    the sub-DPB fullness is set to zero for all the sub-DPBs
    Otherwise, i̶t̶ f NoOutputOfPriorPicsFlag is equal to 1, all picture storage buffers that contain
    pictures with nuh_layer_id equal to currLayerId in the sub-DPB are emptied without output
    of the pictures they contain, and the sub-DPB fullness is decremented by the number of
    picture storage buffers that were emptied.
    Otherwise (NoOutputOfPriorPicsFlag is equal to 0), all picture storage buffers containing a
    picture that is marked as "not needed for output" and "unused for reference" are emptied
    (without output), and all non-empty picture storage buffers that contain pictures with
    nuh_layer_id equal to currLayerId in the sub-DPB are output by repeatedly invoking the
    "bumping" process specified in subclause C.5.2.4 until all these pictures are marked as "not

TABLE 4-continued

Example Embodiment C needed for output", all pictures that have nuh_layer_id equal to currLayerId in the sub-DPB are emptied, and the sub-DPB fullness is decremented by the number of picture storage buffers emptied.

Example Embodiment D

In this embodiment, the flushing operation is performed across layers, and occurs when the base layer picture starts a new CVS. The determination of output or non-output is also determined at the base layer picture.

TABLE 5

Example Embodiment D

C.3.2 Removal of pictures from the DPB
When the current picture is not picture 0 in the current layer, the removal of pictures in the current layer, with nuh_layer_id equal to currLayerId, from the DPB before decoding of the current picture, i.e. picture n, but after parsing the slice header of the first slice of the current picture, happens instantaneously at the CPB removal time of the first decoding unit of the current picture and proceeds as follows:
    The decoding process for RPS as specified in subclause 8.3.1 is invoked.
    When the current picture is an IRAP picture with NoRaslOutputFlag equal to 1, or the base layer picture in the current access unit is an IRAP picture with NoRaslOutputFlag equal to 1 and NoClrasOutputFlag is equal to 1, the following ordered steps are applied:
    1. The variable NoOutputOfPriorPicsFlag is derived for the decoder under test as follows:
        If the current picture is a CRA picture with NoRaslOutputFlag equal to 1,
        NoOutputOfPriorPicsFlag is set equal to 1 (regardless of the value of
        no_output_of_prior_pics_flag).
        Otherwise, if the current picture is an IRAP picture with NoRaslOutputFlag equal to 1 and
        the value of pic_width_in_luma_samples, pic_height_in_luma_samples,
        chroma_format_idc, bit_depth_luma_minus8, bit_depth_chroma_minus8, or
        sps_max_dec_pic_buffering_minus1[ HighestTid ] derived from the active SPS for the
        current layer is different from the value of pic_width_in_luma_samples,
        pic_height_in_luma_samples, chroma_format_idc, bit_depth_luma_minus8,
        bit_depth_chroma_minus8, or sps_max_dec_pic_buffering_minus1[ HighestTid ],
        respectively, derived from the SPS that was active for the current layer when decoding the
        preceding picture in the current layer, NoOutputOfPriorPicsFlag may (but should not) be set
        to 1 by the decoder under test, regardless of the value of no_output_of_prior_pics_flag.
            NOTE - Although setting NoOutputOfPriorPicsFlag equal to
            no_output_of_prior_pics_flag is preferred under these conditions, the decoder under
            test is allowed to set NoOutputOfPriorPicsFlag to 1 in this case.
        Otherwise, if the current picture is an IRAP picture with NoRaslOutputFlag equal to 1,
        NoOutputOfPriorPicsFlag is set equal to no_output_of_prior_pics_flag.
        Otherwise (the current picture is not an IRAP picture with NoRaslOutputFlag equal to 1, the
        base layer picture in the current access unit is an IRAP picture with NoRaslOutputFlag
        equal to 1, and NoClrasOutputFlag is equal to 1), NoOutputOfPriorPicsFlag is set equal to
        1.
    2. The value of NoOutputOfPriorPicsFlag derived for the decoder under test is applied for the
        HRD, such that when the value of NoOutputOfPriorPicsFlag is equal to 1 for a picture with
        nuh_layer_id equal to 0 and NoRaslOutputFlag equal to 1, all picture storage buffers ~~that contain pictures with nuh_layer_id equal to currLayerId in the sub~~ DPB are emptied without
        output of the pictures they contain, and the DPB fullness is decremented by the number of
        picture storage buffers that were emptied.
  When both of the following conditions are true for any pictures k in the DPB, all such pictures k in
the DPB are removed from the DPB:
        picture k is marked as "unused for reference"
        picture k has PicOutputFlag equal to 0 or its DPB output time is less than or equal to the CPB
        removal time of the first decoding unit (denoted as decoding unit m) of the current picture n; i.e.
        DpbOutputTime[ k ] is less than or equal to CpbRemovalTime( m )
    For each picture that is removed from the DPB, the DPB fullness is decremented by one.
C.5.2.2. Output and removal of pictures from the DPB
When the current picture is not picture 0 in the current layer, the output and removal of pictures in the current layer, with nuh_layer_id equal to currLayerId, from the DPB before the decoding of the current picture , i.e. picture n, but after parsing the slice header of the first slice of the current picture and before the invocation of the decoding process for picture order count, happens instantaneously when the first decoding unit of the current picture is removed from the CPB and proceeds as follows:
    When the current picture is a POC resetting picture, all pictures in the DPB that do not belong to the
    current access unit and that are marked as "needed for output" are output, starting with pictures with
    the smallest value of PicOrderCntVal of all pictures excluding those in the current access unit in the
    DPB, in ascending order of the PicOrderCntVal values, and pictures with the same value of
    PicOrderCntVal are output in ascending order of the nuh_layer_id values. When a picture is output, it
    is cropped using the conformance cropping window specified in the active SPS for the picture, the
    cropped picture is output, and the picture is marked as "not needed for output".
    The decoding processes for picture order count and RPS are invoked. When decoding a CVS TABLE 5-continued Example Embodiment D conforming to one or more of the profiles specified in Annex A using the decoding process specified
in clauses 2 through 10, the decoding processes for picture order count and RPS that are invoked are
as specified in subclauses 8.3.1and 8.3.2, respectively. When decoding a CVS conforming to one or
more of the profiles specified in Annex G or H using the decoding process specified in Annex F, and
Annex G or H, the decoding processes for picture order count and RPS that are invoked are as
specified in subclauses F.8.3.1 and F.8.3.2, respectively.
If the current picture is an IRAP picture with NoRaslOutputFlag equal to 1, or the base layer picture
in the current access unit is an IRAP picture with NoRaslOutputFlag equal to 1 and
NoClrasOutputFlag is equal to 1, the following ordered steps are applied:
1. The variable NoOutputOfPriorPicsFlag is derived for the decoder under test as follows:
    If the current picture is a CRA picture with NoRaslOutputFlag equal to 1,
    NoOutputOfPriorPicsFlag is set equal to 1 (regardless of the value of
    no_output_of_prior_pics_flag).
    Otherwise, if the current picture is an IRAP picture with NoRaslOutputFlag equal to 1 and
    the value of pic_width_in_luma_samples, pic_height_in_luma_samples,
    chroma_format_idc, bit_depth_luma_minus8, bit_depth_chroma_minus8, or
    sps_max_dec_pic_buffering_minus1[ HighestTid ] derived from the active SPS for the
    current layer is different from the value of pic_width_in_luma_samples,
    pic_height_in_luma_samples, chroma_format_idc, bit_depth_luma_minus8,
    bit_depth_chroma_minus8, or sps_max_decpic_buffering_minus1[ HighestTid ],
    respectively, derived from the SPS that was active for the current layer when decoding the
    preceding picture in the current layer, NoOutputOfPriorPicsFlag may (but should not) be set
    to 1 by the decoder under test, regardless of the value of no_output_of_prior_pics_flag.
      NOTE - Although setting NoOutputOfPriorPicsFlag equal to
      no_output_of_prior_pics_flag is preferred under these conditions, the decoder under
      test is allowed to set NoOutputOfPriorPicsFlag to 1 in this case.
    Otherwise, if the current picture is an IRAP picture with NoRaslOutputFlag equal to 1,
    NoOutputOfPriorPicsFlag is set equal to no_output_of_prior_pics_flag.
    Otherwise (the current picture is not an IRAP picture with NoRaslOutputFlag equal to 1, the
    base layer picture in the current access unit is an IRAP picture with NoRaslOutputFlag
    equal to 1, and NoClrasOutputFlag is equal to 1), NoOutputOfPriorPicsFlag is set equal to
    1.
2. The value of NoOutputOfPriorPicsFlag derived for the decoder under test is applied for the HRD
    as follows:
    If NoOutputOfPriorPicsFlag is equal to 1 and the current picture is a picture with
    nuh_layer_id equal to 0 and NoRaslOutputFlag equal to 1, all picture storage buffers ~~that
    contain pictures with nuh_layer_id equal to currLayerId~~ in the ~~sub~~ DPB are emptied without
    output of the pictures they contain, and the sub-DPB fullness of all sub-DPBs is
    ~~decremented by the number of picture decremented by the number of picture~~ set to 0.
    Otherwise ~~( if~~ NoOutputOfPriorPicsFlag is equal to 0 ~~)~~ and the current picture is a picture
    with nuh_layer_id equal to 0 and NoRaslOutputFlag equal to 1, all picture storage buffers
    containing a picture that is marked as "not needed for output" and "unused for reference" are
    emptied (without output), and all non-empty picture storage buffers that contain pictures
    ~~with nuh_layer_id equal to currLayerId~~ in the ~~sub~~ DPB are output by repeatedly invoking
    the "bumping" process specified in subclause C.5.2.4 until all these pictures are marked as
    "not needed for output", all pictures ~~that have nuh_layer_id equal to currLayerId~~ in the ~~sub~~
    DPB are emptied, and the sub-DPB fullness of all sub-DPBs is ~~decremented by the number
    of picture storage buffers emptied~~ set to 0.

Method of Picture Flushing for Multi-Layer Bitstreams

Figure 5:
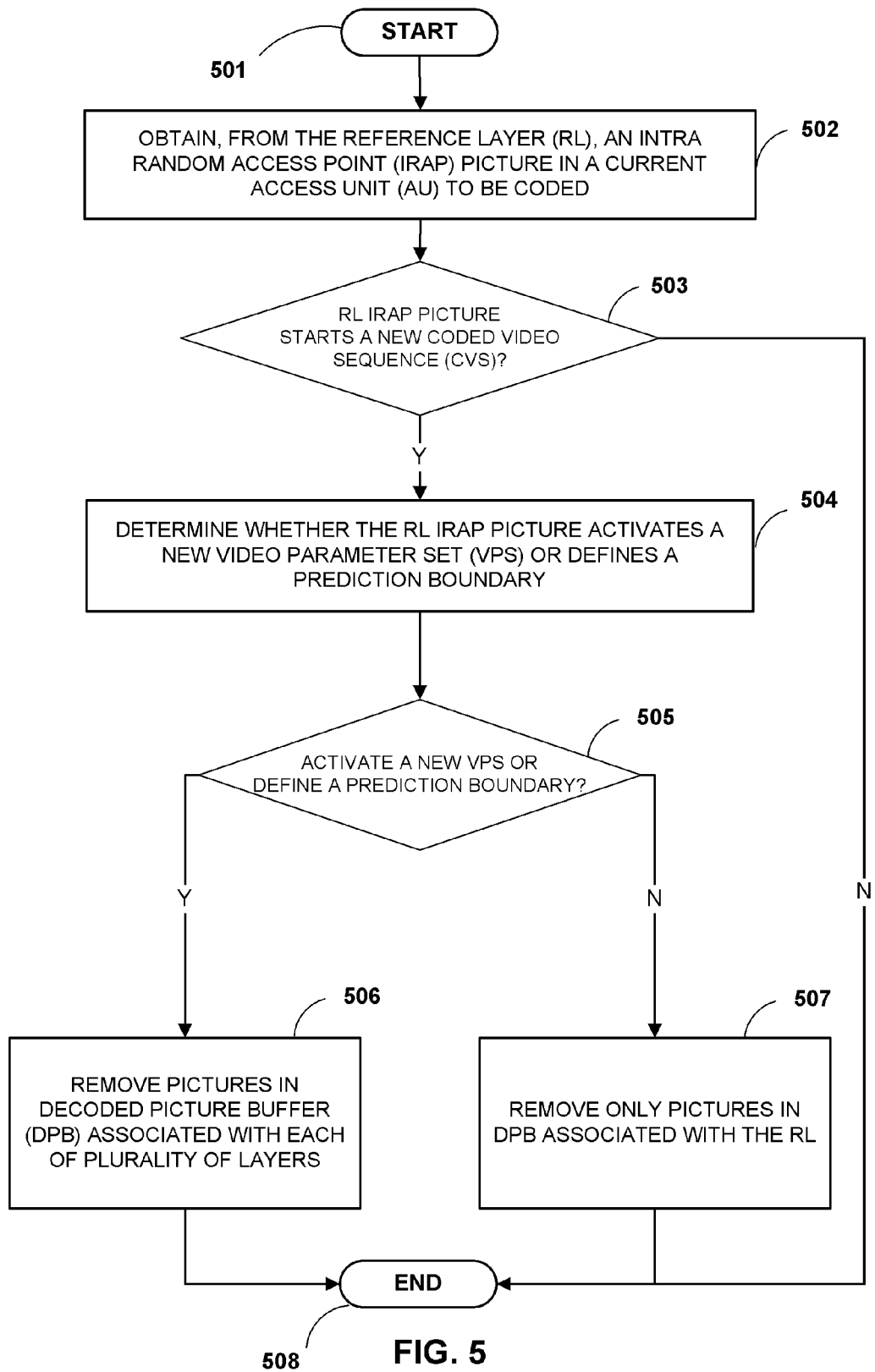
FIG. 5 is a flowchart illustrating a method of coding video information, according to one embodiment of the present disclosure.

FIG. 5 is a flowchart illustrating a method of coding video information, according to one embodiment of the present disclosure. The method relates to picture buffering for multi-layer bitstreams. The process 500 may be performed by an encoder (e.g., the encoder as shown in FIG. 2A, 2B, etc.), a decoder (e.g., the decoder as shown in FIG. 3A, 3B, etc.), or any other component, depending on the embodiment. The blocks of the process 500 are described with respect to the decoder 33 in FIG. 3B, but the process 500 may be performed by other components, such as an encoder, as mentioned above. The layer 1 video decoder 30B of the decoder 33 and/or the layer 0 decoder 30A of the decoder 33 may perform the process 500, depending on the embodiment. All embodiments described with respect to FIG. 5 may be implemented separately, or in combination with one another. Certain details relating to the process 500 are explained above, e.g., with respect to FIG. 4.

The process 500 starts at block 501. The decoder 33 can include a memory (e.g., decoded picture buffer 160) for storing video information associated with a plurality of layers including a reference layer. The memory can include a DPB associated with each layer. In some embodiments, the DPB associated with each layer can be referred to as a sub-DPB and can be included as a part of a DPB.

At block 502, the decoder 33 obtains, from the reference layer, an IRAP picture in a current access unit (AU) to be coded. In certain embodiments, the reference layer is the base layer. In other embodiments, the reference layer is the lowest layer of the plurality of layers, other than a base layer, from which the current AU includes a picture. The current AU may not include a picture in the base layer.

In response to determining that the reference layer IRAP picture starts a new CVS at block 503, the decoder 33 determines whether the reference layer IRAP picture activates a new video parameter set (VPS) or defines a prediction boundary at the current AU at block 504. In response to determining that the reference layer IRAP picture activates a new video parameter set (VPS) or determining that the reference layer IRAP picture defines a prediction boundary at the current AU at block 505, the decoder 33 removes pictures in the DPB associated with each of the plurality of layers at block 506. In response to determining that the reference layer IRAP picture does not activate a new VPS and determining that the reference layer IRAP picture does not define a prediction boundary at the current AU at block 505, the decoder 33 removes only pictures in the DPB associated with the reference layer at block 507. If the reference layer IRAP picture does not start a new CVS at block 503, the process 500 ends at block 508.

In some embodiments, the decoder 33 determines the value of a first flag indicating whether to output pictures in a DPB, wherein the determination is performed only for a picture in the reference layer that is a base layer. The first flag can be NoOutputOfPriorPicsFlag. In certain embodiments, the decoder 33 determines the value of a first flag indicating whether to output pictures in a DPB, wherein the determination is performed for a picture in an independent layer of the plurality of layers but not performed for a picture in a dependent layer of the plurality of layers. In other embodiments, in response to determining that the reference layer IRAP picture starts a new CVS and defines a prediction boundary at the current AU: the decoder 33 determines the value of a first flag indicating whether to output pictures in a DPB, the first flag being associated with the reference IRAP picture; in response to determining that the value of the first flag indicates that pictures in a DPB should be output, outputs pictures that precede the current AU in decoding order in the DPBs associated with the plurality of layers; and removes the pictures that precede the current AU in decoding order in the DPBs associated with the plurality of layers.

In one embodiment, the decoder 33 determines the value of a first flag indicating whether to output pictures in a DPB, the first flag being associated with the reference IRAP picture; and in response to determining that the value of the first flag indicates that pictures in a DPB should be output and that the reference layer IRAP picture starts a new CVS, outputs pictures that precede the reference layer IRAP picture. In this embodiment, the decoder 33 can be an output order conformant decoder.

In certain embodiments, the decoder 33 outputs pictures to be removed in the DPBs associated with the plurality of layers based on the value of a first flag indicating whether to output pictures in a DPB, the first flag being associated with the reference layer IRAP picture. For example, in response to determining that the value of the first flag indicates that pictures in a DPB should be output, the decoder 33 outputs the pictures to be removed in the DPBs associated with the plurality of layers prior to removing the pictures to be removed. As mentioned above, the first flag in the different embodiments can refer to NoOutputOfPriorPicsFlag.

The process ends at block 508. Blocks may be added and/or omitted in the process 500, depending on the embodiment, and blocks of the process 500 may be performed in different orders, depending on the embodiment.

Any features and/or embodiments described with respect to picture flushing for multi-layer bitstreams in this disclosure may be implemented separately or in any combination thereof. For example, any features and/or embodiments described in connection with FIGS. 1-4 and other parts of the disclosure may be implemented in any combination with any features and/or embodiments described in connection with FIG. 5, and vice versa.

DPB Parameter Inference for Multi-Layer Bitstreams

A multi-layer bitstream, such as an SHVC or an MV-HEVC bitstream, would be conforming to one or more profiles Annex A as well as one or more profiles in Annex G or H. Some DPB parameters in the SHVC and/or MV-HEVC specifications may be derived or inferred based on which Annex contains the profile that is used to decode the bitstream. Consider the following paragraphs in Annex C of the MV-HEVC specification (e.g., Working Draft 7 of MV-HEVC, also reflected or to be reflected in Working Drafts of SHVC subsequent to Working Draft 5). The following paragraphs describe various variables, such as MaxLayerDecPicBuffMinus1, MaxNumReorderPics, MaxLatencyIncreasePlus1, MaxLatencyPictures, and MaxDecPicBufferingMinus1.

The following paragraph is from subclause C.1:

TABLE 6

| Annex C, subclause C.1 |
|---|
| For each bitstream conformance test, the CPB size (number of bits) for the bitstream-specific CPB operation and the BPB size for the bitstream-partition-specific CPB operation is CpbSize[ SchedSelIdx ] as specified in subclause E.3.3, where SchedSelIdx and the HRD parameters are specified above in this subclause. When a CVS conforming to one or more of the profiles specified in Annex A is decoded by applying the decoding process specified in clauses 2-10, the sub-DPB size (number of picture storage buffers) of the sub-DPB for the base layer is sps_max_dec_pic_buffering_minus 1 [ HighestTid ] + 1, where sps_max_dec_pic_buffering_minus1[ HighestTid ] is from the active SPS for the base layer. When a CVS conforming to one or more of the profiles specified in Annex G or H is decoded by applying the decoding process specified in clauses 2-10, Annex F, and Annex G or H, the sub-DPB size of the sub-DPB for a layer with nuh_layer_id equal to currLayerId is max_vp s_decp ic_buffering_minus1 [ TargetOutputLayerSetIdx ][ subDpbIdx ][ HighestTid ] + 1, where the variable subDpbIdx is equal to SubDpbAssigned[ LayerSetIdxForOutputLayerSet[ TargetOptLayerSetIdx ] ][ layerIdx ] and LayerSetLayerIdList[ lsIdx ][ layerIdx ] is equal to currLayerId. |

The following paragraph is from subclause C.5.2.1:

TABLE 7

| Annex C, subclause C.5.2.1 |
|---|
| When these processes are applied for a layer with nuh_layer_id equal to currLayerId, the variables MaxNumReorderPics, MaxLatencyIncreasePlus1, MaxLatencyPictures, and MaxDecPicBufferingMinus1 are derived as follows:<br>  If a CVS conforming to one or more of the profiles specified in Annex G or H is decoded by applying the decoding process specified in clauses 2-10, Annex F, and Annex G or H, the following applies:<br>    MaxNumReorderPics is set equal to<br>    max_vps_num_reorderpics[ TargetOutputLayerSetIdx ][ HighestTid ] of the active VPS. |

TABLE 7-continued

Annex C, subclause C.5.2.1

MaxLatencyIncreasePlus1 is set equal to the value of the syntax element
max_vps_latency_increase_plus1[ TargetOutputLayerSetIdx ][ HighestTid ] of the active VPS.
MaxLatencyPictures is set equal to
VpsMaxLatencyPictures[ TargetOutputLayerSetIdx ][ HighestTid ] of the active VPS.
MaxDecPicBufferingMinus1 is set equal to the value of the syntax element
max_vps_dec_pic_buffering_minus1[ TargetOutputLayerSetIdx ][ subDpbIdx ][ HighestTid ] of
the active VPS, where the value of the variable subDpbIdx is equal to
SubDpbAssigned[ LayerSetIdxForOutputLayerSet[ TargetOptLayerSetIdx ] ][ layerIdx ] and
LayerSetLayerIdList[ lsIdx ][ layerIdx ] is equal to currLayerId.
MaxLayerDecPicBuffMinus1 is set equal to the value of the syntax element
max_vps_layer_dec_pic_buff minus1[ TargetOptLayerSetIdx ][ LayerIdxInVps[ currLayerId ] ][
HighestTid ] of the active VPS.
Otherwise (a CVS conforming to one or more of the profiles specified in Annex A is decoded by
applying the decoding process specified in clauses 2-10), the following applies:
  MaxNumReorderPics is set equal to sps_max_num_reorder_pics[ HighestTid ] of the active SPS
  for the base layer.
  MaxLatencyIncreasePlus1 is set equal to sps_max_latency_increase_plus1 [ HighestTid ] of the
  active SPS for the base layer.
  MaxLatencyPictures is set equal to SpsMaxLatencyPictures[ HighestTid ] of the active SPS for
  the base layer.
  MaxDecPicBufferingMinus1 and MaxLayerDecPicBuffMinus1 are both set equal to
  sps_max_dec_pic_buffering_minus1[ HighestTid ] of the active SPS for the base layer.

Any HEVC bitstream or any SHVC/MV-HEVC bitstream would be conformant to one or more profiles in Annex A and one or more profiles in Annex G or H. When the above subclauses are applied, the value of the DPB parameters is ambiguous or unavailable. Moreover, the DPB parameters signaled in the VPS extension are neither signaled nor inferred for the 0-th output layer set, where the layer set only comprises the base layer and only the base layer pictures are output.

Example Embodiment E

According to certain aspects, it would be sufficient to infer the values of MaxLayerDecPicBuffMinus1, MaxNumReorderPics, MaxLatencyIncreasePlus1, MaxLatencyPictures, and MaxDecPicBufferingMinus1 for the 0-th output layer set as equal to the values signaled for the active SPS of the base layer. By only referring to these inferred values in Annex C, the ambiguity can be removed.

In Example Embodiment E, the values of the variables that are associated with the DPB parameters of the 0-th output layer set (e.g., max_vps_dec_pic_buffering_minus1, max_vps_layer_dec_pic_buffering_minus1, and max_vps_latency_increase_plus1) in Annex C, subclause C.1 are set equal to the values of the corresponding attributes in the active SPS. The example embodiment is provided in the context of earlier versions of SHVC and MV-HEVC (e.g., SHVC WD 5 and/or MV-HEVC WD 7). Additions to the earlier versions of SHVC and MV-HEVC are indicated in italics, and deletions from the earlier versions of SHVC and MV-HEVC are indicated in strikethrough. Similar or same concepts and/or text are applicable to SHVC, and have been reflected or are to be reflected in Working Drafts of SHVC subsequent to WD 5. Accordingly, the example embodiment is also applicable to SHVC. In Example Embodiment E, the values of the variables specified in Annex C, subclause C.1 are set equal to the values of the corresponding attributes in the active SPS; in other embodiments, the values of the corresponding attributes in the active SPS can be set equal to the values of the variables specified in Annex C, subclause C.1.

TABLE 8

Example Embodiment E

The semantics of syntax elements in dpb size( ) are modified as follows.
max_vps_dec_pic_buffering_minus1[ i ][ k ][ j ] plus 1 specifies the maximum required size of the k-th
sub-DPB for the CVS in the i-th output layer set in units of picture storage buffers when HighestTid is
equal to j. When j is greater than 0, max_vps_dec_pic_buffering_minus1[ i ][ k ][ j ] shall be greater than
or equal to max_vps_dec_pic_buffering_minus1[ i ][ k ][ j - 1 ] . When
max_vps_dec_pic_buffering_minus1[ i ][ k ][ j ] is not present for j in the range of 1 to
MaxSubLayersInLayerSetMinus1[ i ], inclusive, it is inferred to be equal to
max_vps_dec_pic_buffering_minus1[ i ][ k ][ j - 1] . The value of
max vps dec_pic_buffering_minus1 if [0][0][j] is inferred to be equal to
sps_max dec_pic_buffering_minus1[ j ] of the active SPS of the base layer.
max_vps_layer_dec_pic_buff_minus1[ i ][ k ][ j ] plus 1 specifies the maximum number of decoded
pictures, of the k-th layer for the CVS in the i-th output layer set, that need to be stored in the DPB when
HighestTid is equal to j. When j is greater than 0, max_vps_layer_dec_pic_buff_minus1[ i ][ k ][ j ] shall
be greater than or equal to max_vps_layer_dec_pic_buff_minus1[ i ][ k ][ j - 1 ]. When
max_vps_layer_dec_pic_buff_minus1[ i ][ k ][ j ] is not present for j in the range of 1 to
vps_max_sub_layers_minus1 - 1, inclusive, it is inferred to be equal to
max_vps_layer_dec_pic_buff_minus1[ i ][ k ][ j - 1]. The value of
max_vps_layer_dec_pic_buffering_minus1[ 0 ][ 0][ j ] is inferred to be equal to
sps_max_dec_pic_buffering_minus1[ j ] of the active SPS of the base layer.
max_vps_num_reorder_pics[ i ][ j ] specifies, when HighestTid is equal to j, the maximum allowed
number of access units containing a picture with PicOutputFlag equal to 1 that can precede any access
unit auA that contains a picture with PicOutputFlag equal to 1 in the i-th output layer set in the CVS in TABLE 8-continued Example Embodiment E decoding order and follow the access unit auA that contains a picture with PicOutputFlag equal to 1 in output order. When max_vps_num_reorder_pics[ i ][ j ] is not present for j in the range of 1 to MaxSubLayersInLayerSetMinus1[ i ], inclusive, due to sub_layer_dpb_info_present_flag[ i ][ j ] being equal to 0, it is inferred to be equal to max_vps_num_reorder_pics[ i ][ j - 1]. The value of max_vps_num_reorder _pics[ 0 ][ j ] is inferred to be equal to sps_max_num_reorder_pics[ j ] of the active SPS of the base layer.
max_vps_latency_increase_plus1[ i ][ j ] not equal to 0 is used to compute the value of VpsMaxLatencyPictures[ i ][ j ], which, when HighestTid is equal to j, specifies the maximum number of access units containing a picture with PicOutputFlag equal to 1 in the i-th output layer set that can precede any access unit auA that contains a picture with PicOutputFlag equal to 1 in the CVS in output order and follow the access unit auA that contains a picture with PicOutputFlag equal to 1 in decoding order. When max_vps_latency_increase_plus1[ i ][ j ] is not present for j in the range of 1 to MaxSubLayersInLayerSetMinus1[ i ], inclusive, due to sub_layer_dpb_info_present_flag[ i ][ j ] being equal to 0, it is inferred to be equal to max_vps_latency_increase_plus1[ i ][ j - 1 ]. The value of max_vps_latency_increase _plus1[ 0 ][ j ] is inferred to be equal to sps_max_latency_increase _plus1[ j ] of the active SPS of the base layer.
When max_vps_latency_increase_plus1[ i ][ j ] is not equal to 0, the value of VpsMaxLatencyPictures[ i ][ j ] is specified as follows:
    VpsMaxLatencyPictures[ i ][ j ] = max_vps_num_reorder_pics[ i ][ j ] +
      max_vps_latency_increase_plus1[ i ] [ j ] - 1 (F-6)
When max_vps_latency_increase_plus1[ i ][ j ] is equal to 0, no corresponding limit is expressed. The value of max_vps_latency_increase_plus1[ i ][ j ] shall be in the range of 0 to $2^{32}$ - 2, inclusive.
The following paragraph in subclause C.1 is modified as follows.
For each bitstream conformance test, the CPB size (number of bits) for the bitstream-specific CPB operation and the BPB size for the bitstream-partition-specific CPB operation is CpbSize[ SchedSelIdx ] as specified in subclause E.3.3, where SchedSelIdx and the HRD parameters are specified above in this subclause. ~~When a CVS conforming to one or more of the profiles specified in Annex A is decoded by applying the decoding process specified in clauses 2-10, the sub-DPB size ( number of picture storage buffers ) of the sub-DPB for the base layer is sps_max_ _dec_pic_buffering_minus1 [ HighestTid ] +1, where sps_max_dec_pic_buffering_minus1 [ HighestTid ] is from the active SPS for the base layer. When a CVS conforming to one or more of the profiles specified in Annex G or H is decoded by applying the decoding process specified in clauses 2-10, Annex F, and Annex G or H, t~~ The sub-DPB size of the sub-DPB for a layer with nuh_layer_id equal to currLayerId is
max_vps_dec_pic_buffering_minus1[ TargetOutputLayerSetIdx ][ subDpbIdx ][ HighestTid ] + 1, where the variable subDpbIdx is equal to
SubDpbAssigned[ LayerSetIdxForOutputLayerSet[ TargetOptLayerSetIdx ] ][ layerIdx ] and LayerSetLayerIdList[ lsIdx ][ layerIdx ] is equal to currLayerId.
The following paragraph in subclause C.4 is modified as follows.
    7. For each current picture, after invocation of the process for removal of pictures from the sub-DPB as specified in subclause C.3.2, the following two conditions shall be satisfied.
       ~~+~~ The number of decoded pictures in the sub-DPB for the current layer, including all pictures
        n ~~in the current layer~~ that are marked as "used for reference", or that have PicOutputFlag
        equal to 1 and AuCpbRemovalTime[ n ] less than or equal to
        AuCpbRemovalTime[ currPic ], where currPic is the current picture, shall be less than or
        equal to ~~sps_max_dec_pic_buffering_minus1 [ HighestTid ] when currPicLayerId is equal to 0 or~~
        max_vps_dec_pic_buffering_minus1[ TargetOutputLayerSetIdx ][ subDpbIdx ][ HighestTid
        ] ~~when currPicLayerId is greater than 0~~, where the variable subDpbIdx is equal to
        SubDpbAssigned[ LayerSetIdxForOutputLayerSet[ TargetOptLayerSetIdx ] ][ layerIdx ] and
        LayerSetLayerIdList[ lsIdx ][ layerIdx ] is equal to currPicLayerId.
     The number of decoded pictures in the sub-DPB for the current layer, including all pictures
      n in the current layer that are marked as "used for reference", or that have PicOutputFlag
      equal to 1 and AuCpbRemovalTime [n ] less than AuCpbRemovalTime[ currPic 1 where
      currPic is the current picture, shall be less than or equal to
      max_vps_layer_dec_pic_buff_minus1 [ TargetOutputLayerSetIdx ][ layerIdx ][ HighestTid ],
      where the variable layerIdx is such that
      LayerSetLayerIdList[ LayerSetIdxForOutputLayerSet[ TargetOptLayerSeIdx ] ][ layerIdx ]
      is equal to currPicLayerId.
The following paragraphs in subclause C.5.2.1 are modified as follows.
When these processes are applied for a layer with nuh_layer_id equal to currLayerId, the variables MaxNumReorderPics, MaxLatencyIncreasePlus1, MaxLatencyPictures, and MaxDecPicBufferingMinus1 are derived as follows:
~~If a CVS conforming to one or more of the profiles specified in AnnexG or H is decoded by applying the decoding process specified in clauses 2-10, Annex F, and Annex G or H, the following applies:~~
    MaxNumReorderPicsis set equal to
    max_vps_num_reorder_pics[ TargetOutputLayerSetIdx ][ HighestTid ] of the active VPS.
    MaxLatencyIncreasePlus1 is set equal to the value of the syntax element
    max_vps_latency_increase_plus1[ TargetOutputLayerSetIdx ][ HighestTid ] of the active VPS.
    MaxLatencyPictures is set equal to
    VpsMaxLatencyPictures[ TargetOutputLayerSetIdx ][ HighestTid ] of the active VPS.
    MaxDecPicBufferingMinus1is set equal to the value of the syntax element
    max_vps_dec_pic_buffering_minus1[ TargetOutputLayerSetIdx ][ subDpbIdx ][ HighestTid ] of
    the active VPS, where the value of the variable subDpbIdx is equal to
    SubDpbAssigned[ LayerSetIdxForOutputLayerSet[ TargetOptLayerSetIdx ] ][ layerIdx ] and
    LayerSetLayerIdList[ lsIdx ][ layerIdx ] is equal to currLayerId.

TABLE 8-continued

Example Embodiment E

MaxLayerDecPicBuffMinus1 is set equal to the value of the syntax element
max_vps_layer_dec_pic_buff_minus1[ TargetOptLayerSetIdx ][ LayerIdxInVps[ currLayerId ] ][
HighestTid ] of the active VPS.
~~Otherwise ( a CVS conforming to one or more of the profiles specified in Annex A is decoded by~~
~~applying the decoding process specified in Clauses 2-10),the following applies~~
    ~~MaxNumReorderPics is set equal to sps_max_num_reorder_Pics[HighestTid] of the active SP~~
    ~~for the base layer.~~
    ~~MaxLatencyIncreasePlus1 is set equal to sps_max_latency_increase_plus1[HighestTid] of the~~
    ~~active SPS for the base layer.~~
    ~~MaxLatencyPictures is set equal to SpsMaxLatencyPictures [ HighestTid ] of the active SPS for~~
    ~~the base layer.~~
~~MaxDecPicBufferingMinus1 and MaxLayerDecPicBuffMinus1 are both set equal to~~
~~sps_max_dec_pic_buffering_minus1 [ HighestTid ] of the active SPS for the base layer.~~

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the disclosure have been described. These and other embodiments are within the scope of the following claims.

What is claimed is:

1. An apparatus for coding video information, comprising:
a memory configured to store video data associated with a plurality of layers including a reference layer, the memory comprising a decoded picture buffer (DPB) associated with each layer; and
a hardware processor operationally coupled to the memory and configured to:
obtain, from the reference layer, an intra random access point (IRAP) picture in a current access unit (AU) to be coded;

determine whether the reference layer IRAP picture activates a new video parameter set (VPS) or is associated with a NoClrasOutputFlag having a value of 1, the NoClrasOutputFlag indicative of whether a cross-layer random access skip (CL-RAS) picture is to be output;

in response to a determination that the reference layer IRAP picture activates a new VPS or is associated with a NoClrasOutputFlag having a value of 1, remove pictures in the DPB associated with each of the plurality of layers; and in response to a determination that the reference layer IRAP picture does not activate a new VPS and is not associated with a NoClrasOutputFlag having a value of 1, remove only pictures in the DPB associated with the reference layer.

2. The apparatus of claim 1, wherein the reference layer is a base layer.

3. The apparatus of claim 1, wherein the reference layer is a lowest layer, other than a base layer, of the plurality of layers from which the current AU includes a picture, the current AU not including a picture in the base layer.

4. The apparatus of claim 1, wherein the processor is further configured to:
determine a value of a first flag indicating whether to output pictures in a DPB, wherein the determination is performed only for a picture in the reference layer that is a base layer.

5. The apparatus of claim 1, wherein the processor is further configured to:
determine a value of a first flag indicating whether to output pictures in a DPB, wherein the determination is performed for a picture in an independent layer of the plurality of layers but not performed for a picture in a dependent layer of the plurality of layers.

6. The apparatus of claim 1, wherein the processor is further configured to:
in response to determining that the reference layer RAP picture starts a new coded video sequence (CVS) and defines a prediction boundary at the current AU:
determine a value of a first flag indicating whether to output pictures in a DPB, the first flag being associated with the reference IRAP picture;
in response to determining that the value of the first flag indicates that pictures in a DPB should be output, output pictures that precede the current AU in decoding order in the DPBs associated with the plurality of layers; and
remove the pictures that precede the current AU in decoding order in the DPBs associated with the plurality of layers.

7. The apparatus of claim 1, wherein the processor is further configured to:
determine a value of a first flag indicating whether to output pictures in a DPB, the first flag being associated with the reference IRAP picture; and
in response to determining that the value of the first flag indicates that pictures in a DPB should be output and that the reference layer TRAP picture starts a new CVS, output pictures that precede the reference layer TRAP picture.

8. The apparatus of claim 7, wherein the apparatus is an output order conformant decoder.

9. The apparatus of claim 1, wherein the processor is further configured to output pictures to be removed in the DPBs associated with the plurality of layers based on the value of a first flag indicating whether to output pictures in a DPB, the first flag being associated with the reference layer IRAP picture.

10. The apparatus of claim 9, wherein the process is further configured to:
in response to determining that the value of the first flag indicates that pictures in a DPB should be output, output the pictures to be removed in the DPBs associated with the plurality of layers prior to removing the pictures to be removed.

11. The apparatus of claim 10, wherein the first flag is NoOutputOfPriorPicsFlag.

12. A method of coding video information, comprising:
using one or more computing devices comprising computer hardware:
storing video data associated with a plurality of layers including a reference layer, the memory comprising a decoded picture buffer (DPB) associated with each layer;
obtaining, from the reference layer, an intra random access point (IRAP) picture in a current access unit (AU) to be coded;
determining whether the reference layer IRAP picture activates a new video parameter set (VPS) or is associated with a NoClrasOutputFlag having a value of 1, the NoClrasOutputFlag indicative of whether a cross-layer random access skip (CL-RAS) picture is to be output; and
in response to determining that the reference layer RAP picture activates a new VPS or is associated with a NoClrasOutputFlag having a value of 1, removing pictures in the DPB associated with each of the plurality of layers; or
in response to determining that the reference layer IRAP picture does not activate a new VPS and is not associated with a NoClrasOutputFlag having a value of 1, removing only pictures in the DPB associated with the reference layer.

13. The method of claim 12, wherein the reference layer is a base layer.

14. The method of claim 12, wherein the reference layer is a lowest layer of the plurality of layers, other than a base layer, from which the current AU includes a picture, the current AU not including a picture in the base layer.

15. The method of claim 12, further comprising:
determining a value of a first flag indicating whether to output pictures in a DPB, wherein the determination is performed only for a picture in the reference layer that is a base layer.

16. The method of claim 12, further comprising:
determining a value of a first flag indicating whether to output pictures in a DPB, wherein the determination is performed for a picture in an independent layer of the plurality of layers but not performed for a picture in a dependent layer of the plurality of layers.

17. The method of claim 12, further comprising:
in response to determining that the reference layer IRAP picture starts a new CVS and defines a prediction boundary at the current AU:
determining a value of a first flag indicating whether to output pictures in a DPB, the first flag being associated with the reference IRAP picture;
in response to determining that the value of the first flag indicates that pictures in a DPB should be output, outputting pictures that precede the current AU in decoding order in the DPBs associated with the plurality of layers; and removing the pictures that precede the current AU in decoding order in the DPBs associated with the plurality of layers.

18. The method of claim 12, further comprising:
determining a value of a first flag indicating whether to output pictures in a DPB, the first flag being associated with the reference RAP picture; and
in response to determining that the value of the first flag indicates that pictures in a DPB should be output and that the reference layer TRAP picture starts a new CVS, outputting pictures that precede the reference layer RAP picture.

19. The method of claim 18, wherein the one or more computing devices include an output order conformant decoder.

20. The method of claim 12, further comprising outputting pictures to be removed in the DPBs associated with the plurality of layers based on the value of a first flag indicating whether to output pictures in a DPB, the first flag being associated with the reference layer IRAP picture.

21. The method of claim 20, further comprising:
in response to determining that the value of the first flag indicates that pictures in a DPB should be output, outputting the pictures to be removed in the DPBs associated with the plurality of layers prior to removing the pictures to be removed.

22. The method of claim 21, wherein the first flag is NoOutputOfPriorPicsFlag.

23. A non-transitory computer readable medium comprising instructions that when executed on a processor comprising computer hardware cause the processor to:
store video data associated with a plurality of layers including a reference layer, the memory comprising a decoded picture buffer (DPB) associated with each layer;
obtain, from the reference layer, an intra random access point (RAP) picture in a current access unit (AU) to be coded;
determine whether the reference layer RAP picture activates a new video parameter set (VPS) or is associated with a NoClrasOutputFlag having a value of 1, the NoClrasOutputFlag indicative of whether a cross-layer random access skip (CL-RAS) picture is to be output;
in response to a determination that the reference layer IRAP picture activates a new VPS or is associated with a NoClrasOutputFlag having a value of 1, remove pictures in the DPB associated with each of the plurality of layers; and
in response to a determination that the reference layer IRAP picture does not activate a new VPS and is not associated with a NoClrasOutputFlag having a value of 1, remove only pictures in the DPB associated with the reference layer.

24. The computer readable medium of claim 23, wherein the instructions further cause the processor to output pictures to be removed in the DPBs associated with the plurality of layers based on the value of a first flag indicating whether to output pictures in a DPB, the first flag being associated with the reference layer RAP picture.

25. The computer readable medium of claim 24, wherein the instructions further cause the processor to:
in response to determining that the value of the first flag indicates that pictures in a DPB should be output, output the pictures to be removed in the DPBs associated with the plurality of layers prior to removing the pictures to be removed.

26. An apparatus for coding video information, comprising:
means for storing video data associated with a plurality of layers including a reference layer, the means for storing comprising a decoded picture buffer (DPB) associated with each layer; and
means for obtaining, from the reference layer, an intra random access point (RAP) picture in a current access unit (AU) to be coded, the means for obtaining configured to:
determine whether the reference layer IRAP picture activates a new video parameter set (VPS) or is associated with a NoClrasOutputFlag having a value of 1, the NoClrasOutputFlag indicative of whether a cross-layer random access skip (CL-RAS) picture is to be output;
in response to a determination that the reference layer RAP picture activates a new VPS or is associated with a NoClrasOutputFlag having a value of 1, remove pictures in the DPB associated with each of the plurality of layers; and
in response to a determination that the reference layer RAP picture does not activate a new VPS and is not associated with a NoClrasOutputFlag having a value of 1, remove only pictures in the DPB associated with the reference layer.

27. The apparatus of claim 26, wherein the means for obtaining the IRAP picture is further configured to output pictures to be removed in the DPBs associated with the plurality of layers based on the value of a first flag indicating whether to output pictures in a DPB, the first flag being associated with the reference layer IRAP picture.

28. The apparatus of claim 27, wherein the means for obtaining the IRAP picture is further configured to:
in response to determining that the value of the first flag indicates that pictures in a DPB should be output, output the pictures to be removed in the DPBs associated with the plurality of layers prior to removing the pictures to be removed.

* * * * *